United States Patent [19]

Shenk

[11] 4,348,089
[45] * Sep. 7, 1982

[54] LENS MOVEMENT ACTUATED REFERENCE AND SEQUENCING MEANS FOR CAMERAS HAVING UNIDIRECTIONAL AUTOMATIC FOCUSING

[75] Inventor: Edwin K. Shenk, Westford, Mass.

[73] Assignee: Polaroid Corporation, Cambridge, Mass.

[*] Notice: The portion of the term of this patent subsequent to Apr. 22, 1997, has been disclaimed.

[21] Appl. No.: 13,681

[22] Filed: Feb. 21, 1979

Related U.S. Application Data

[63] Continuation of Ser. No. 865,852, Dec. 30, 1977, abandoned, which is a continuation-in-part of Ser. No. 729,289, Oct. 4, 1976, abandoned.

[51] Int. Cl.³ .................................................. G03B 3/10
[52] U.S. Cl. ...................................... 354/195; 354/25; 352/140
[58] Field of Search .................... 354/5, 25, 195, 196, 354/197-201; 352/140

[56] References Cited

U.S. PATENT DOCUMENTS

| | | | |
|---|---|---|---|
| 3,435,744 | 4/1969 | Stimson | 354/25 |
| 3,442,193 | 5/1969 | Pagel | 354/25 |
| 3,443,602 | 5/1969 | Harvey | 354/25 |
| 3,522,764 | 8/1970 | Biber et al. | 354/195 |
| 3,618,499 | 11/1971 | Harvey | 354/25 |
| 3,713,371 | 1/1973 | Kurihara et al. | 354/25 |
| 3,914,777 | 10/1975 | Slavitter | 354/196 |
| 4,040,065 | 8/1977 | Booth | 354/5 |
| 4,080,531 | 3/1978 | Stauffer | 354/25 |
| 4,199,244 | 4/1980 | Shenk | 354/195 |

Primary Examiner—L. T. Hix
Assistant Examiner—S. D. Schreyer
Attorney, Agent, or Firm—John J. Kelleher

[57] ABSTRACT

A unidirectional focus control system for a variable focus lens moves said lens outside of its normal focusing range in order to establish a reliable reference point to which or from which said lens is moved for variable focus lens focusing. In addition, lens movement outside of its normal focusing range provides the means for actuating switch means whose actuation initiates or inhibits the initiation of an event or a series of events.

62 Claims, 7 Drawing Figures

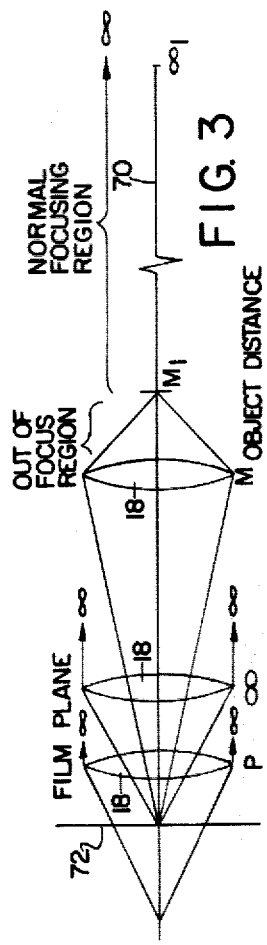
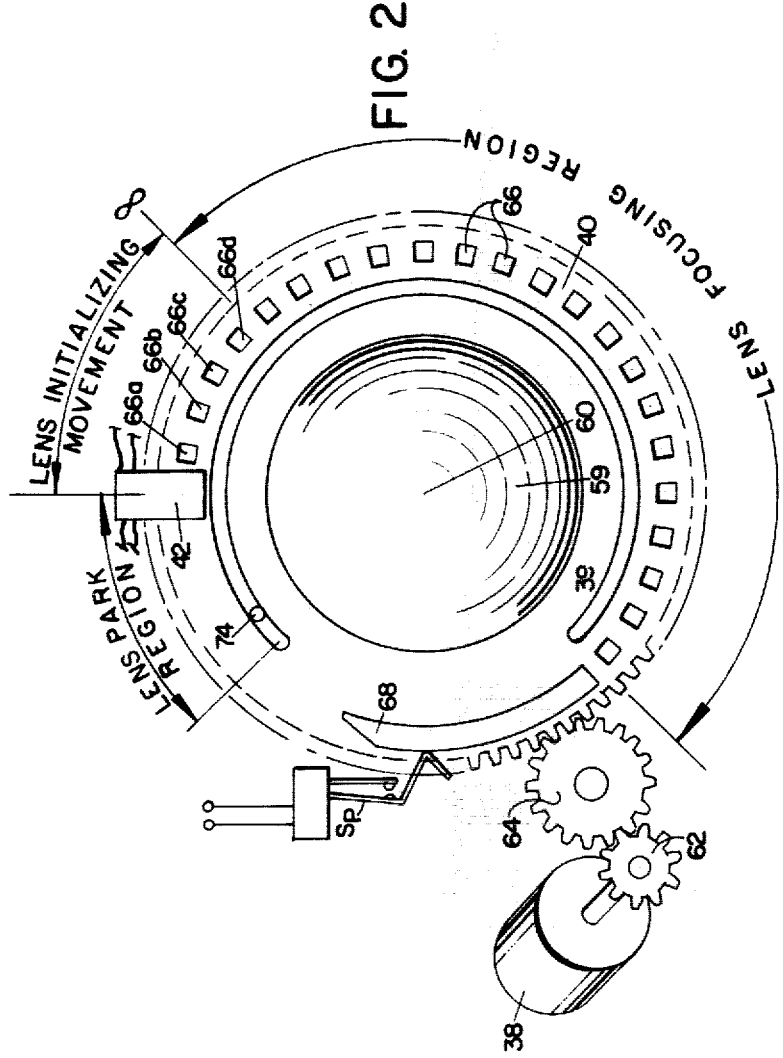

LENS MOVEMENT ACTUATED REFERENCE AND SEQUENCING MEANS FOR CAMERAS HAVING UNIDIRECTIONAL AUTOMATIC FOCUSING

This is a continuation of application Ser. No. 865,852 filed Dec. 30, 1977, now abandoned, which in turn is a continuation-in-part of application Ser. No. 729,289 filed Oct. 4, 1976, now abandoned and replaced by continuation application Ser. No. 916,114 filed June 16, 1978, which is now U.S. Pat. No. 4,199,244.

BACKGROUND OF THE INVENTION

1. Field of the Invention

The present invention relates to a control system for a variable focus lens in general, and to such a control system for a variable focus lens in a photographic camera, in particular.

2. Description of the Prior Art

Variable focus lenses and apparatus utilizing such lenses such as photographic cameras, telescopes and the like are well known and their operation are well understood in the prior art. A camera having a variable focus lens and having a focus control system coupled to said lens for automatically focusing image-containing light rays of a remote object at the film plane of said camera in response to a rangefinder derived signal representative of the actual distance between said camera and said remote object, are known in the prior art. A camera having such a focus control system that utilizes acoustical energy to determine the distance to an object remote from said camera is described in U.S. Pat. No. 3,522,764 to BIBER et al.

A bidirectional focus control system, i.e., a focus control system that, once commanded to do so, can move the movable element of a variable focus lens in either of two directions from any initial position within the normal focusing range of said lens, for focusing purposes, is also known in the prior art. One example of such a system is described in the above-mentioned BIBER et al. patent.

Another type of focus control system for a variable focus lens is sometimes referred to as an unidirectional focus control system in that the movable or focusing element of such a lens is always moved from the same or known reference point for focusing purposes. While such an element is movable in either of two axial directions, no lens focusing is performed as said element moves within its focusing range towards said reference point. A unidirectional focus control system of this type is signficantly less complex than a bidirectional focus control system because it is unnecessary to continuously monitor lens element movement as said element is moved toward said known reference point. The cost savings attendant a unidirectional focus control system over a bidirectional focus control system makes it attractive to the control system designer. An example of a unidirectional focus control system for a variable focus camera lens is described in U.S. Pat. No. 3,713,371 to KURIHARA et al.

When utilizing a unidirectional focus control system for a variable focus lens, it is necessary to always return the movable element of such a lens to a known reference point as previously mentioned. As a practical matter, what this means is that an actuator must fairly rapidly drive said movable lens element into a fixed mechanical stop that functions as said known reference point, which often results in said movable element bouncing off and normally remaining at some fixed distance or at some offset from said fixed mechanical stop. The unidirectional focus control system will incorrectly assume that the movable lens element is resting against said mechanical stop or is positioned at said known reference point and may misfocus the lens in proportion to said bounce distance or offset. Even if the movable element is positioned precisely at a known reference point the mechanical coupling between said movable element and the actuator that is driving said element is normally fairly loose which will enable said actuator to move a finite distance before it moves said movable lens element, which may also result in a misfocusing of said variable focus lens by said unidirectional focus control system because of said finite distance movement.

In a variable focus control system, it is sometimes desirable to be able to utilize lens movement as the triggering means to initiate a lens related function or series of functions. If such an event is to be initiated well within the focusing range of said variable focus lens, lens movement can often by readily utilized as said triggering or initiating means. However, if the event is to be initiated precisely at either end of the variable focus lens focusing range, certain problems are encountered, especially if the event is to be both initiated and terminated at the same position. In such a situation, lens movement is required before an event is initiated at one end of the focusing range or the other. By definition then, the event cannot occur until the lens has moved, at least a finite distance away from its starting point, which necessarily causes an event initiation error that is proportional to said finite distance. This error can be minimized, but it cannot be entirely eliminated. Even when this error has been minimized to what might be deemed an acceptible level, it is very difficult, if not impossible, to construct switch means that will open and close at precisely the same point in response to lens element movement, whether such movement be rotational or translational. This difference between the opening and closing position of the movable element of a variable focus lens to open and close said switch means may introduce additional control system or event errors that might make the use of lens movement to initiate and/or terminate events at the focusing range end points of a variable focus lens, impractical.

SUMMARY OF THE INVENTION

In accordance with a preferred embodiment of the present invention, a unidirectional focus control system for a variable focus lens is provided that moves said lens outside of its normal focusing range in order to provide an accurately defined reference point from which or to which said lens is always moved for variable focus lens focusing.

In addition, lens movement outside of its normal focusing range is utilized to actuate switch means or lens movement sensing means whose actuation or state is utilized to control functions that are related to or supportive of lens focusing and/or to control other devices that might be combined with said variable focus lens.

BRIEF DESCRIPTION OF THE DRAWINGS

FIG. 2 is a front elevational view of the lens mounted motor driven encoder gear, lens movement actuated switch, and the lens position sensing pick-off module of the present invention.

FIG. 3 is a schematic diagram showing the full range of movement of the variable focus lenses controlled by the focus control systems of the present invention.

DESCRIPTION OF THE PREFERRED EMBODIMENTS

Figure 1:
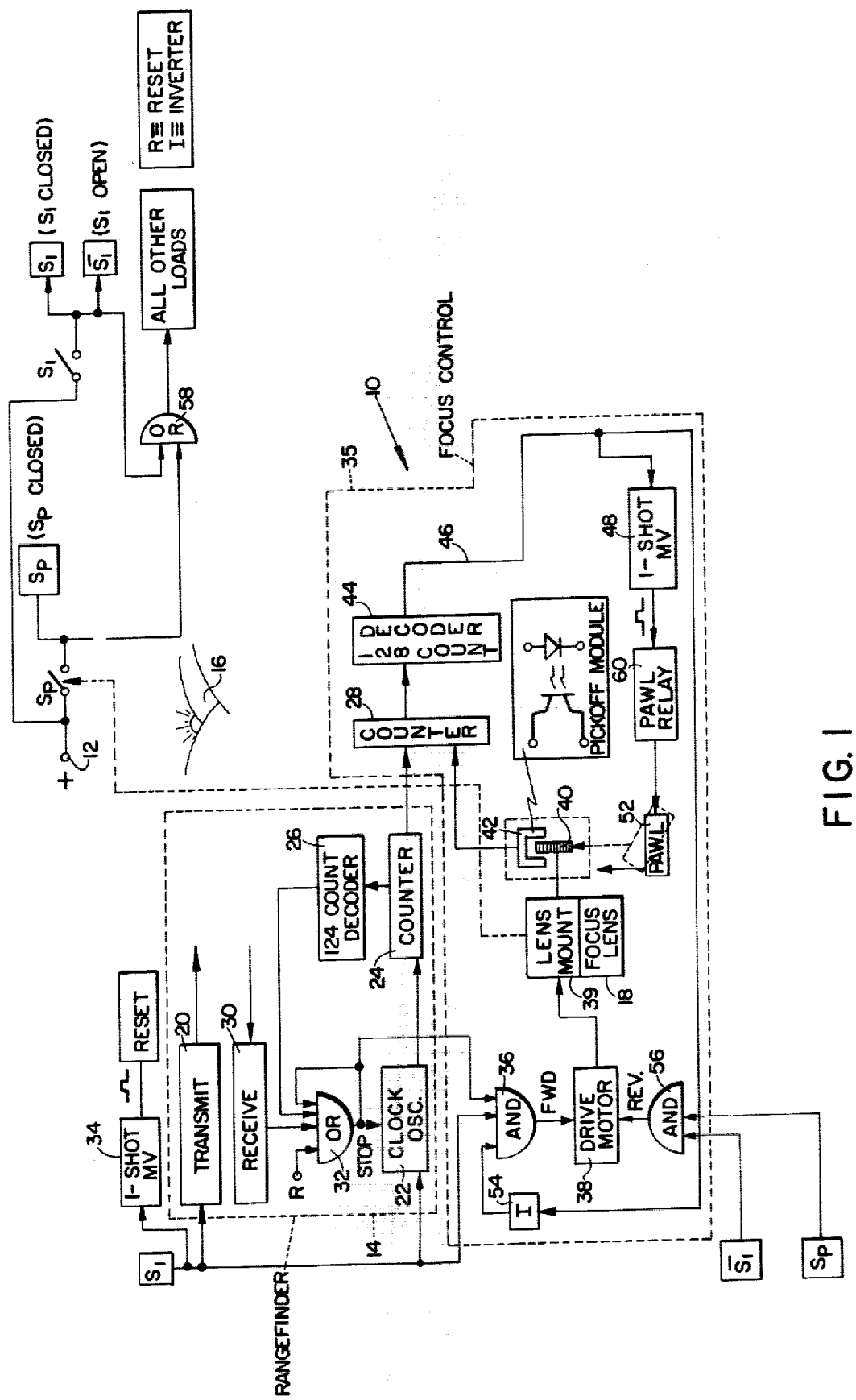
FIG. 1 is a schematic diagram of an automatic focus control system for a variable focus lens that is constructed in accordance with a preferred embodiment of the present invention.

Referring now to the drawings and, specifically, to FIG. 1, where a schematic diagram of an automatic focus control system for a variable focus lens incorporating a preferred embodiment of the present invention is depicted. A source of electrical power (not shown) is supplied to one terminal of spring force biased, manually actuated, single pole switch $S_1$ and to one terminal of lens movement actuated single pole switch $S_p$ through terminal 12, to which said source of power is connected. Either signal $S_1$ or signal $\bar{S}_1$ will appear at the output of switch $S_1$ when said switch $S_1$ is actuated. Signal $S_1$ will appear at the output of switch $S_1$ when switch $S_1$ is closed and signal $\bar{S}_1$ will appear at the output of switch $S_1$ when switch $S_1$ is opened. Signal $S_p$ will appear at the output of switch $S_p$ when said switch $S_p$ is closed. Rangefinder 14 determines the distance to object 16 for variable focus lens 18 focusing purposes. Rangefinder 14 may be optional, but is preferably of the acoustical type similar to that shown in U.S. Pat. No. 3,522,764 to BIBER et al, or as shown in copending application Ser. No. 840,802 by MUGGLI.

Rangefinder 14 is actuated by manually closing spring force biased switch $S_1$, said switch $S_1$ being normally spring force biased to the open position. When switch $S_1$ is closed, transmitter 20 and clock oscillator 22 are simultaneously activated. Transmitter 20 transmits an acoustical burst of energy toward object 16 and clock oscillator 22 starts generating a series of equally spaced time related pulses. Counter 24 counts the pulses being generated by clock oscillator 22 and transmits these pulses to decoder 26 and to counter 28. Upon receipt of an acoustical echo reflected from object 16, initially transmitted by transmitter 20, receiver 30 generates and transmits a signal to clock oscillator 22 through latching OR gate 32 to stop clock oscillator 22 at a point where the number of pulses generated by said clock oscillator 22 are representative of the total time taken for said acoustical burst of energy to reach object 16 from rangefinder 14 and to return to said rangefinder 14. The speed of sound in air is well known and therefore if one knows the time it takes to transmit an acoustical burst of energy to and receive a reflection or an echo of that acoustical burst of energy from a remote object, the distance to that remote object can be readily determined. If clock oscillator 22 generates 124 pulses before receiver 30 receives a reflection of the acoustical energy transmitted by transmitter 20, decoder 26 will send a signal to clock oscillator 22 through latching OR gate 32 to stop clock oscillator 22 at 124 pulses. Decoder 26 limits clock oscillator 22 to 124 pulses because 124 pulses represents the infinity focus position of variable focus lens 18 and any object located beyond that position, which would otherwise result in clock oscillator 22 generating more than 124 pulses, is assumed to be in focus.

As previously mentioned, gate 32 is a latching OR gate which means that if a normal input to gate 32 is removed, the output from said gate 32 that is caused by said input will be maintained. This is so because once there is an output at a logic gate of this type, said output is fed back into the input of the same gate which causes said gate to be maintained in its conducting state. The output from gate 32 is removed only when said gate is reset by a pulse that is generated by one-shot multivibrator 34, said multivibrator generating said pulse when switch $S_1$ is actuated to its closed position.

In variable focus lens control system 10, focusing, i.e., movement of variable focus lens 18 by focus control portion 35 of said control system 10 is not initiated until the distance to an object such as object 16 has first been determined. When an output appears at latching OR gate 32, the distance to object 16 has been determined so far as focus control portion 35 of said control system 10 is concerned. When the output from latching OR gate 32 is combined with signal $S_1$ from closed switch $S_1$, AND gate 36 wil conduct and transmit a drive forward signal to drive motor 38 until focusing is complete which will move lens mount 39 and the movable element of variable focus lens 18 in the forward direction for lens focusing purposes. Encoder wheel 40 is mounted in a fixed relation with respect to lens mount 39 and therefore encoder wheel 40 movement is representative of the position of lens mount 39 and of the movable element of variable focus lens 18 which is mounted on said lens mount 39.

Pick-off module 42 includes a light emitting diode and a light sensitive transistor that is sensitive to the light output from said light emitting diode. As encoder wheel 40 rotates in response to lens mount 39 movement, slots in said encoder wheel 40 alternately block and unblock the light being transmitted between the light emitting diode and the light sensitive transistor in pick-off module 42 thereby generating pulses that are representative of the position of lens mount 39 and the movable element of variable focus lens 18. The pulses from pick-off module 42 are transmitted to and are counted by counter 28. When the number of pulses generated by clock oscillator 22 and pick-off module 42 reach a combined total of 128 in counter 28, decoder 44 generates output signal 46 indicating that the focusing of variable focus lens 18 is complete. Focus complete signal 46 causes one-shot multivibrator 48 to momentarily energize pawl relay 50 which causes pawl 52 to engage encoder wheel 40 thereby stopping the motion of said encoder wheel 40 and the movable element of variable focus lens 18. Simultaneously therewith, focusing complete signal 46 is inverted by inverter 54 and the lack of an output from inverter 54 causes AND gate 36 to open, thereby shutting off the drive forward signal to drive motor 38 which removes the lens focusing driving force from lens mount 39. At this point, an image of object 16 has been focused at an image plane for viewing through variable focus lens 18.

When the viewing of object 16 through variable focus lens 18 is complete, switch $S_1$ is opened. When switch $S_1$ is opened, signal $\bar{S}_1$ is generated at the output of switch $S_1$ and is transmitted to AND gate 56. When signal $\bar{S}_1$ and signal $S_p$ are combined, AND gate 56 conducts and a reverse drive signal is sent to drive motor 38, causing said drive motor 38 to drive lens mount 39 and the movable element of variable focus lens 18 in a direction opposite to that in which it was driven in order to focus variable focus lens 18 on object 16. As previously discussed, signal $S_p$ is generated when switch $S_p$ is actuated to the closed position. Switch $S_p$ is coupled to lens mount 39 and it is the movement of lens mount 39 that actuates switch $S_p$. When lens mount 39 moves from its initial position toward its in-focus position, switch $S_p$ is actuated to its closed position thereby generating signal $S_p$ at its output. Conversely, when switch $S_p$ is actuated to its open position by lens mount 16 movement from its in-focus position to its initial position, signal $S_p$ disappears from its output. The actuation of switch $S_p$ in relationship to the position of lens mount 39 constitutes a basic part of the present invention and the actuation of this switch with respect to said lens mount 39 will be discussed in greater detail with respect to FIGS. 2 and 3.

With continued reference to FIG. 1 it should be noted that in addition to the control or logic signals provided by switches $S_1$ and $S_p$, these switches can also be utilized to disconnect any and all loads from the power source that is supplying power to terminal 12. The outputs of switches $S_1$ and $S_p$ are also fed to OR gate 58 and then to as many electrical loads as desired. When switch $S_1$ is eventually opened, power continues to be supplied to variable focus lens control system 10 and any other selected loads through lens movement actuated switch $S_p$. However, when switch $S_p$ is returned to its initial position, switch $S_p$ opens and all electrical loads that are receiving power through switch $S_p$ and terminal 12 are disconnected.

Turning now to FIG. 2, which is a front elevational view depicting the lens movement actuator and the lens position sensing means of the present invention. Movable lens element 59 is mounted on lens mount 39 for rotational movement about and along axis 60. Encoder wheel 40 is mounted on lens mount 39 and the periphery of encoder wheel 40 is in the form of a gear that is coupled to drive motor 38 through drive motor pinion gear 62 and idler gear 64.

Variable focus lens 18 (FIG. 1) is mounted on support housing (not shown) in a manner that is similar to the way in which the variable focus lens depicted in U.S. Pat. No. 3,914,777 to SLAVITTER is mounted on its support housing. Lens mount 39 has a threaded portion of circular cross section, that moves into and out of a mating threaded member that houses the fixed elements of said variable focus lens 18 as in said SLAVITTER patent, as said lens mount 39 together with movable element 59 is rotated about rotational axis 60. The relationship between drive motor 38 and movable element 59 of variable focus lens 18 is such that drive motor 38 provides the driving force that moves movable element 59 about and along said axis 60.

Encoder wheel 40 includes a plurality of slots 66 extending through said encoder wheel 40, said slots being positioned at the same fixed radial distance from axis 60, said slots being equally spaced along said fixed radial distance. When the threaded portion of lens mount 39 of movable lens element 59 is rotated and thereby threaded into the housing that supports the fixed lens elements of variable focus lens 18, a known relationship must be established between the rotational position of slots 66 about axis 60 and the axial position of movable lens element 59 of variable focus lens 18 along said axis 60. Once this relationship has been established, the focal position of variable focus lens 18 can be determined by counting the number of pulses generated by pick-off module 42 as slots 66 are rotationally moved through pick-off module 42 by drive motor 38. The specific details of how slots 66 cooperate with pick-off module 42 to generate a series of pulses was described above with reference to FIG. 1.

Encoder wheel 40 also includes cam portion 68 projecting from the front face thereof. As encoder wheel 40 is driven in a clockwise direction by manual means or by drive motor 38, cam portion 68 of encoder wheel 40 eventually engages switch $S_p$ and actuates said switch $S_p$ to its open position. The position of encoder wheel 40 where switch $S_p$ is in its open position is herein defined as the park position of variable focus lens 18 (FIG. 1). The operation of control system 10 (FIG. 1) is largely dependent upon the rotational and axial position of movable element 59 of variable focus lens 18 for the actuation of switch $S_p$ and the generation of pulse by pick-off module 42. Therefore, at this point it would be useful to refer to FIG. 3 in order to fully appreciate the full range of movement of said movable element 59 and how said lens element movement relates to the operation of said control system 10.

In FIG. 3, variable focus lens 18 is depicted as a single lens element that is movable along object distance axis 70 for focusing purposes. Any object located between position $M_1$ and $\infty_1$ on object distance axis 70 is focusable by variable focus lens 18 at image plane 72. Objects located at position $M_1$ on object distance axis 70 will be focused at image plane 72 when variable focus lens 18 is positioned at position M. Therefore, the distance to an object located at $M_1$ represents the minimum focusing distance of said variable focus lens 18. Objects positioned at $\infty_1$ on object distance axis 70 will have an image focused at image plane 72 by variable focus lens 18 when said variable focus lens 18 is positioned at $\infty$. Objects appearing to the left of position $M_1$ on object distance axis 70 cannot be sharply focused at image plane 72 by variable focus lens 18 and therefore objects appearing to the left of said position $M_1$ will be considered as being in the out-of-focus regions of variable focus lens 18. Objects appearing between position $M_1$ and $\infty_1$ on object distance axis 70 are within the normal focusing region of said variable focus lens 18.

In addition to the movement of variable focus lens 18 within its normal focusing range, variable focus lens 18 is also movable outside of its normal focusing range between its $\infty$ position, and position P which represents the park position of variable focus lens 18 or the position at which switch $S_p$ (FIG. 2) is in its open position. In this, the preferred embodiment, the P or park position is located between image plane 72 and the $\infty$ position of variable focus lens 18. However, this particular location for the park position of variable focus lens 18 is merely a design choice and could very well have been located between the M position of variable focus lens 18 and minimum focus position $M_1$ on object distance axis 70.

Having described the full range of movement of variable focus lens 18, the remaining structural features affecting the operation of control system 10 that are depicted in FIG. 2 will now be described. In FIG. 2, variable focus lens 18 is shown in its park position or in that position where switch $S_p$ is in its open position. Switch $S_p$ was actuated to its open position by the rotational engagement of cam portion 68 of encoder wheel 40 with said switch $S_p$. When commanded to do so by control system 10 (FIG. 1), drive motor 38 will drive encoder wheel 40 in a counterclockwise direction which will eventually bring slots 66 into cooperative engagement with pick-off module 42 causing pulses to be generated by said pick-off module 42 in a manner that was previously discussed. Any movement of encoder wheel 40 prior to the time slot 66A influences pick-off module 42 is herein referred to as lens park region movement or movement in the park region of variable focus lens 18. If rangefinder 14 (FIG. 1) has determined that the distance to an object to be viewed through variable focus lens 18 is at infinity, encoder wheel 40 will be moved by drive motor 38 until encoder wheel slots 64a, 64b, 64c and 64d have caused pick-off module 42 to generate four pulses for transmission to counter 28 (FIG. 1). With rangefinder 14 having caused 124 pulses to be generated and transmitted to counter 28 (FIG. 1) these additional four pulses generated by said encoder wheel 40 and pick-off module 42 will add four additional pulses to said counter 28 for a total of 128 counts. Once 128 pulses have been counted by counter 28, lens focusing movement is terminated by control system 10 (FIG. 1) as previously discussed. Movement of variable focus lens 18 from the point where slot 66A of encoder wheel 40 first influences pick-off module 42 to the point where slot 66d of encoder wheel 40 has completed its influence on pick-off module 42 is herein defined as lens initializing movement because it is the minimum amount of lens movement that must occur before the automatic focus control system can correctly focus variable focus lens 18 on any object and it is the minimum amount of movement required before variable focus lens 18 reaches one end of its focusing range which, in this the preferred embodiment, is the infinity position of said variable focus lens 18. If any of slots 66A, 66B, 66C or 66D were unable to cooperate with pick-off module 42 for pulse generating purposes, because of the position of said encoder wheel 40 at the time automatic focusing was initiated, a misfocusing would be caused by the automatic focus control system that would be proportional to the number of such slots that were so positioned. If less than 124 pulses had been transmitted to counter 28 by rangefinder 14, encoder wheel 40 would continue to be driven until the number of pulses generated by said rangefinder 14 and the number of pulses generated by encoder wheel 40 and pick-off module 42 totaled 128 in order to properly focus variable focus lens 18 to the correct subject-in-focus position as determined by said rangefinder 14.

With reference to FIGS. 1 and 2, variable focus lens 18 is returned to its park position, or $S_p$ open position, by releasing spring force biased switch $S_1$ (FIG. 1) as previously discussed when viewing of an object through said variable focus lens is complete. With variable focus lens 18 being in its normal focusing range, $S_p$ is closed and signal $S_p$ is present at its output. By opening switch $S_1$ and generating signal $\bar{S}_1$, signals $\bar{S}_1$ and $S_p$ satisfy AND gate 56 which renders said AND gate 56 conductive. The output of AND gate 56 is transmitted to drive motor 38 causing said drive motor 38 to drive encoder wheel 40 and variable focus lens 18 in a reverse direction towards the park position or the $S_p$ open position of said variable focus lens 18 as previously discussed. When cam portion 68 of encoder wheel 40 engages switch $S_p$ and actuates said switch to its open position, power is removed from drive motor 38 before lens mount 39 is driven into mechanical stop 74 (FIG. 2). Movement of encoder wheel 40 after power has been removed from drive motor 38 is entirely dependent on the inertial forces supplied by drive motor 38, movable lens element 59 and the means coupling said drive motor to said lens element 59. The point at which switch $S_p$ is actuated by cam portion 68 of encoder wheel 40 is not critical so long as at least two conditions are met. One condition is that when encoder wheel 40 comes to rest and switch $S_p$ has been actuated to its open position, slot 66a or an equivalent first slot in encoder wheel 40 must be positioned between pick-off module 42 and the ∞ position of variable focus lens 18. Another condition that must be met, which is very much related to the first described condition, is that when said switch $S_p$ is actuated to its open position causing drive motor 38 to become deenergized, there must be enough inertia associated with said drive motor 38, movable lens element 59 and the means coupling said drive motor 38 to said movable lens element 59 to drive variable focus lens 18 into its park region to the point where slot 66a of encoder wheel 40 is positioned between pick-off module 42 and the ∞ position of said variable focus lens 18. If slots 66a, 66b, 66c and 66d are not positioned between pick-off module 42 and the infinity position of variable focus lens 18 when switch $S_p$ is in its said open position, a misfocusing error will be created that will be proportional to the number of these slots that are not so positioned as previously discussed. In this the preferred embodiment, switch $S_p$ is actuated to its open position before variable focus lens 18 reaches its lens park region as defined in FIG. 2. Also, when switch $S_p$ is in its open position, lens mount 39 may or may not be in contact with mechanical stop 74. Additional conditions may be placed on control system 10 requiring that lens mount 39 be in contact with mechanical stop 74 when switch $S_p$ is open or that switch $S_p$ be opened immediately after slot 66a of encoder wheel 40 is moved between pick-off module 42 and the infinity position of variable focus lens 18 but, such conditions are not necessary for the operation of control system 10 as described herein.

Control system 10 depicted in FIG. 1 has been described as a control system for focusing a variable focus lens in general. However, focus complete signal 46 transmitted by decoder 44 could be utilized to trigger an electrically actuated shutter mechanism in a photographic camera or to initiate such a shutter mechanism and a film processing cycle in a self-processing film camera such as that marketed by the Polaroid Corporation under the registered trademark SX-70.

The present invention may be utilized with a completely automatic focus control system for a photographic camera as mentioned above or, the present invention may be utilized in a photographic camera having both automatic and manual focus control of its variable focus lens such as the camera described in copending application Ser. No. 838,585 by PIZZUTI et al, said application being specifically incorporated in and made a part of the present application. A control system incorporating the present invention for use with the camera described in said PIZZUTI et al. application is schematically depicted in FIG. 4.

Figure 4:
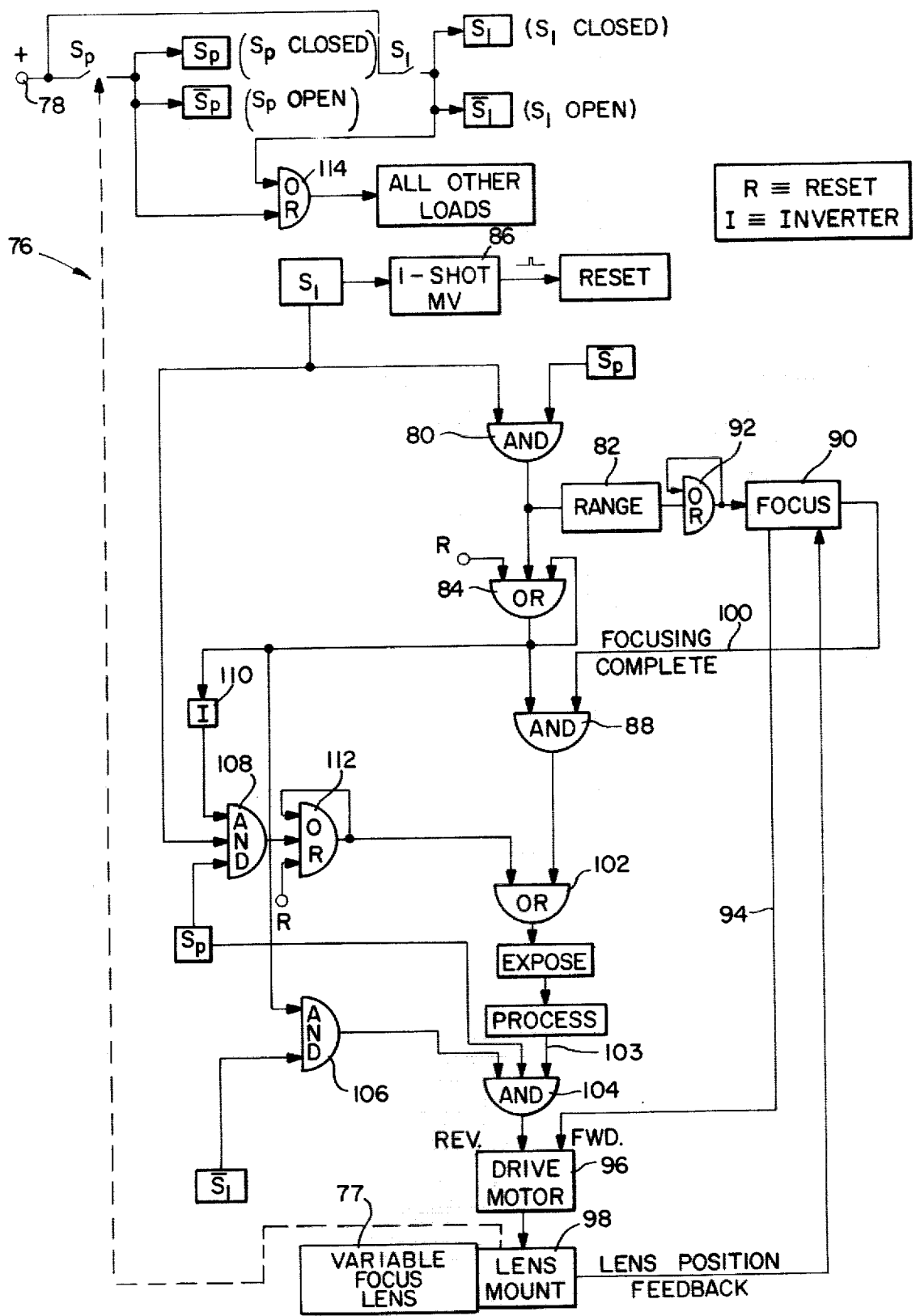
FIG. 4 is a schematic diagram of an automatic and manual focus control system of a preferred embodiment of the present invention that requires manual positioning of said control system from its manual mode to its automatic mode.

In FIG. 4, focus control system 76 utilizing variable focus lens 77 movement outside of its normal focusing range in accordance with a preferred embodiment of the present invention, is depicted. In control system 76, a source of electrical power (not shown) is supplied to one terminal of manually actuated, spring force biased, single pole switch $S_1$ and to one terminal of lens movement actuated single pole switch $S_p$ through terminal 78, to which said source of power is connected. Either signal $S_1$ or signal $\overline{S}_1$ will appear at the output of switch $S_1$ when said switch $S_1$ is actuated. Signal $S_1$ will appear at the output of switch $S_1$ when switch $S_1$ is closed and signal $\overline{S}_1$ will appear at the output of switch $S_1$ when said switch $S_1$ is opened. Similarly, either signals $S_p$ or $\overline{S}_p$ will appear at the output of switch $S_p$ when said switch $S_p$ is actuated. Signal $S_p$ will appear at the output of switch $S_p$ when switch $S_p$ is closed and signal $\overline{S}_p$ will appear at the output of switch $S_p$ when said switch $S_p$ is opened.

When switch $S_1$ is closed for picture taking purposes thereby generating signal $S_1$, AND gate 80 is rendered conductive if lens movement actuated switch $S_p$ is open or if lens 77 is in its park position as previously discussed. If said switch $S_p$ is open, signal $\overline{S}_p$ will appear at AND gate 80 rendering said AND gate 80 conductive when said signal $\overline{S}_p$ is combined with signal $S_1$. When AND gate 80 is rendered conductive, rangefinding means 82 is activated so that it can determine the distance to a subject to be photographed, said rangefinding means 82 functioning in a manner similar to that of rangefinder 14 in FIG. 1. The output from AND gate 80 also renders latching OR gate 84 conductive. Latching OR gate 84 will remain conductive even if the input from AND gate 80 is removed, for the reasons discussed above, said OR gate 84 being rendered nonconductive only when switch $S_1$ causes multivibrator 86 to generate a single reset pulse when said switch $S_1$ is actuated to its closed position. The output of latching OR gate 84 is fed to AND gate 88, said AND gate 88 being held nonconductive until focusing means 90 has caused the positioning of variable focus lens 77 to the correct subject-in-focus position.

After the distance to a subject to be photographed has been determined by rangefinding means 82, a range complete signal is sent to latching OR gate 92 and the output of latching OR gate 92 is transmitted to focus control means 90 to initiate variable focus lens 77 focusing. Latching OR gate 92 maintains a focus initiate signal to focusing means 90 after focusing movement of said variable focus lens 77 has caused the actuation of switch $S_p$ to its closed position rendering AND gate 80 nonconductive and deactivating rangefinding means 82 together with its focus initiating output. Focus control means 90 functions in a manner similar to focus control 35 described above in some detail and depicted in FIG. 1. Focus control means 90 sends drive forward signal 94 to drive motor 96 commanding said drive motor 96 to drive lens mount 98 together with variable focus lens 77 to the correct subject-in-focus position, said in-focus position to be sensed by lens position sensing means similar to that in said focus control system 35 (FIG. 1). Once focusing is complete, focus complete signal 100 renders AND gate 88 conductive and the output from said AND gate 88 renders OR gate 102 conductive. The output from OR gate 102 actuates a shutter mechanism which exposes and subsequently initiates the processing of an instant developing film such as that utilized in the self-processing film camera mentioned above. In a camera where instant developing film is not utilized, the output from OR gate 102 would merely trigger a conventional, electrically actuated shutter mechanism. Once processing is complete or, in the case of a nonself-processing film camera, once the shutter mechanism has been fully actuated, shutter actuation or film processing complete signal 103 is sent to AND gate 104. If switch $S_1$ has been actuated to its open position by a camera operator, signal $\overline{S}_1$ will be generated at its output and AND gate 106 will be rendered conductive because latching OR gate 84 is still in its conductive state as previously discussed, and the output from said OR gate 84 is present at the input of said AND gate 106 together with signal $\overline{S}_1$. AND gate 104 will be rendered conductive upon receipt of completion signal 103 because AND gate 106 has been rendered conductive by the actuation of switch $S_1$ to its open position and signal $S_p$ is already present at the input of said AND gate 104 because switch $S_p$ was actuated to its closed position when variable focus lens 77 moved toward its normal focusing range. When AND gate 104 is rendered conductive, a reverse drive signal is sent to drive motor 96 which, in turn, causes said drive motor to drive lens mount 98 toward its initial or park position to the point where switch $S_p$ has been actuated to its open position by said lens mount 98 movement in a manner similar to that in control system 10 described above and depicted in FIGS. 1 and 2. When switch $S_p$ is actuated to its open position, signal $S_p$ will disappear from its output and gate 104 will be rendered nonconductive, thereby shutting off the reverse drive signal to drive motor 96. At this point, variable focus lens 77 is in its park position or in the position at which switch $S_p$ is open.

If switch $S_p$ had been in the closed position instead of in the open position when switch $S_1$ was initially closed, AND gate 108 rather than AND gate 80 would have been rendered conductive. Switch $S_p$ would be in its closed position if variable focus lens 77 had been manually focused by a camera operator. With switches $S_1$ and $S_p$ both closed, signals $S_1$ and $S_p$ appear at the input of said gate 108. There is an output from inverter 110 because there is no output from latching OR gate 84 due to the lack of an output from AND gate 80, which would satisfy said AND gate 108. An output from AND gate 108 renders latching OR gate 112 conductive, said OR gate 112 remaining in its conductive state until reset as previously discussed. An output from latching OR gate 112 renders OR gate 102 conductive which, in turn, initiates a film exposure and processing cycle in the case of a self-processing film camera or merely actuates an electrically actuated shutter mechanism in the case of a nonself-processing film camera.

Upon completion of film exposure, or of film exposure and processing, whichever the case might be, variable focus lens 77 is not driven back to the point where switch $S_p$ opens or to the park position of said variable focus lens 77 as previously defined, because there will be no input from AND gate 106 to render said AND gate 104 conductive. AND gate 106 remains in its nonconductive state because of the lack of an output from latching OR gate 84.

With continued reference to FIG. 4, it should be noted that in addition to the control or logic signals provided by switches $S_1$ and $S_p$, these switches can also be utilized to disconnect any and all loads from the power source that is supplying power to terminal 78. The outputs of switchs $S_1$ and $S_p$ are also fed to OR gate 114 and then to as many electrical loads as desired. When switch $S_1$ is eventually opened, power continues to be supplied to variable focus lens control system 76 and any other selected loads through lens movement actuated switch $S_p$. However, when lens 77 is returned to its park position, switch $S_p$ is opened and all electrical loads that are receiving power through switch $S_p$ and terminal 78 are disconnected.

In control system 76, variable focus lens 77 is automatically returned to its initial position or to the position where switch $S_p$ is opened only if said switch $S_p$ is open when switch $S_1$ was manually actuated to its closed position. Under these conditions, control system 76 can be viewed as being in its automatic mode. However, if $S_p$ has been closed by the manual movement of variable focus lens 77 into its normal focusing range in order to manually focus said lens on a subject to be photographed, the actuation of switch $S_1$ to its closed position under these conditions will result in variable focus lens 77 remaining at the position to which it was previously manually focused, after a film exposure cycle is complete. It may be desirable to always return a variable focus lens to its automatic position or to the $S_p$ open position after a picture is taken so that the focus control system would always be in a mode that would cause said focus control system to automatically focus a variable focus lens on a subject to be photographed whenever switch $S_1$ is actuated to its closed position unless said variable focus lens had been manually positioned within its normal focusing range some time after switch $S_1$ is actuated to its open position. Such a system is depicted in the schematic diagram of FIG. 5.

Figure 5:
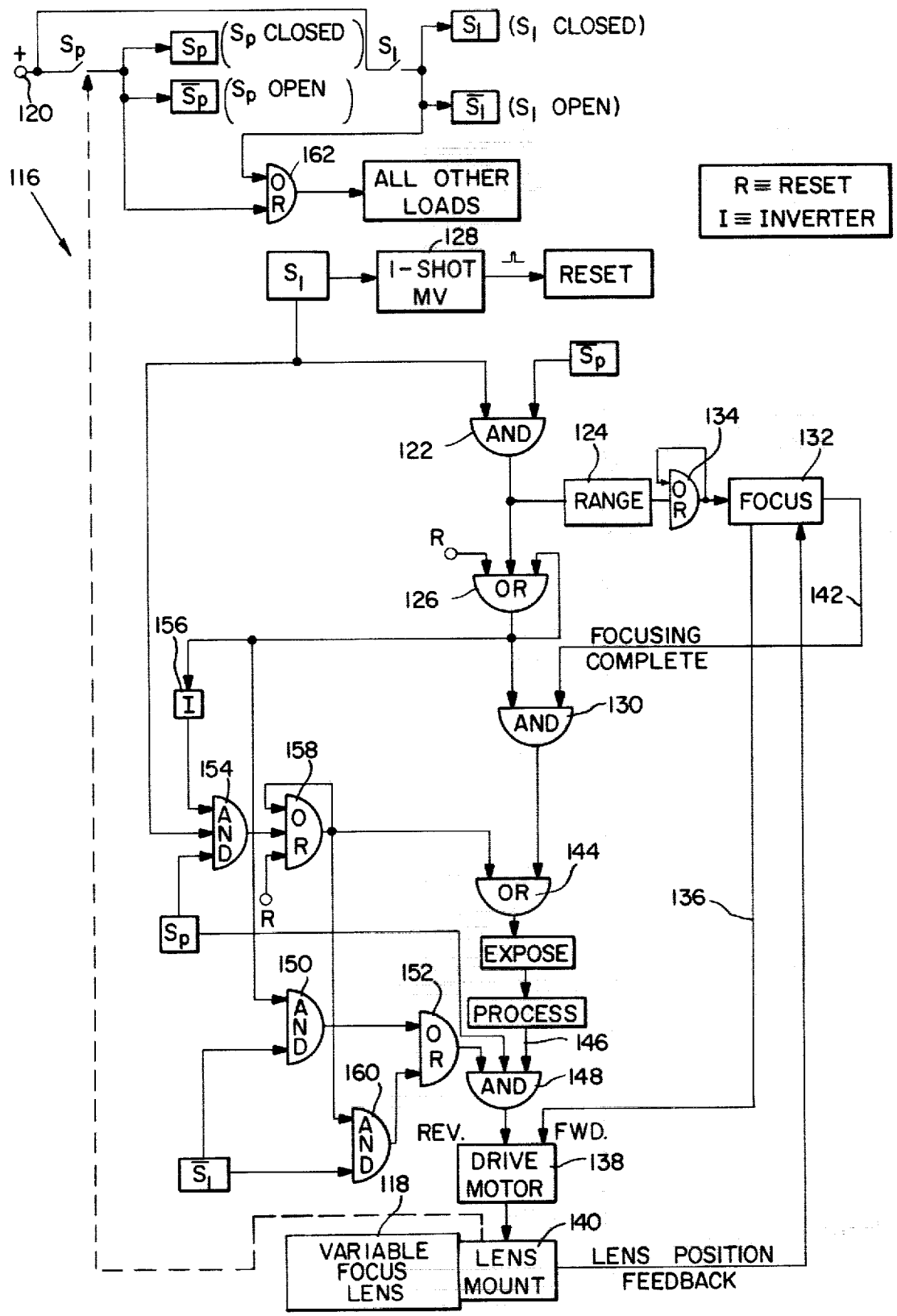
FIG. 5 is a schematic diagram of an automatic and manual focus control system of a preferred embodiment of the present invention that automatically returns said control system to its automatic mode whenever its manual mode is utilized.

In FIG. 5, focus control system 116 utilizing variable focus lens 118 movement outside of its normal focusing range in accordance with a preferred embodiment of the present invention, is depicted. In control system 116, a source of electrical power (not shown) is supplied to one terminal of manually actuated, spring force biased, single pole switch $S_1$ and to one terminal of lens movement actuated signal pole switch $S_p$ through terminal 120, to which said source of power is connected. Either signal $S_1$ or signal $\overline{S}_1$ will appear at the output of switch $S_1$ when said switch $S_1$ is actuated. Signal $S_1$ will appear at the output of switch $S_1$ when switch $S_1$ is closed and signal $\overline{S}_1$ will appear at the output of switch $S_1$ when said switch $S_1$ is opened. Similarly, either signals $S_p$ or $\overline{S}_p$ will appear at the output of switch $S_p$ when said switch $S_p$ is actuated. Signal $S_p$ will appear at the output of switch $S_p$ when switch $S_p$ is closed and signal $\overline{S}_p$ will appear at the output of switch $S_p$ when said switch $S_p$ is opened.

When switch $S_1$ is closed for picture taking purposes thereby generating signal $S_1$ at its output, AND gate 122 is rendered conductive if lens movement actuated switch. $S_p$ is open or if lens 118 is in its park position as previously discussed. If said switch $S_p$ is open, signal $\overline{S}_p$ will appear at AND gate 122 rendering said AND gate 122 conductive when said signal $\overline{S}_p$ is combined with signal $S_l$. When AND gate 122 is rendered conductive, rangefinding means 124 is activated so that it can determine the distance to a subject to be photographed, said rangefinding means 124 functioning in a manner similar to that of rangefinder 14 in FIG. 1. The output from AND gate 122 also renders latching OR gate 126 conductive. Latching OR gate 124 will remain conductive even if the input from AND gate 122 is removed, for reasons discussed above, said OR gate 126 being rendered nonconductive only when switch $S_l$ causes multivibrator 128 to generate a single reset pulse when said switch $S_l$ is actuated to its closed position. The output of latching OR gate 126 is sent to AND gate 130, said AND gate 130 being held nonconductive until focusing means 132 has caused the positioning of variable focus lens 118 to the correct subject-in-focus position. After the distance to a subject to be photographed has been determined by rangefinding means 124, a range complete signal is sent to latching OR gate 134 and the output of latching OR gate 134 is transmitted to focus control means 132 to initiate variable focus lens 118 focusing. Latching OR gate 134 maintains a focus initiate signal to focusing means 132 after focusing movement of said variable focus lens 118 has caused the actuation of switch $S_p$ to its closed position, the effect of which is to render AND gate 122 nonconductive and to deactivate rangefinding means 124 together with its focus initiating output to focus control means 132.

Focus control means 132 functions in a manner similar to focus control 35 described in some detail above and depicted in FIG. 1. Focus control means 132 sends drive forward signal 136 to drive motor 138 commanding said drive motor 138 to drive lens mount 140 together with variable focus lens 118 to the correct subject-in-focus position, said in-focus position to be sensed by lens position sensing means similar to that in focus control system 35 (FIG. 1). Once focusing is complete, focus complete signal 142 renders AND gate 130 conductive and the output from said AND gate 130 renders OR gate 144 conductive. The output from OR gate 144 actuates a shutter mechanism which exposes and subsequently initiates the processing of an instant developing film such as that utilized in the above-mentioned self-processing film camera. In a camera where instant film is not utilized, the output from OR gate 144 would merely trigger a conventional, electrically actuated shutter mechanism. Once processing is complete or, in the case of a nonself-processing film camera, once the shutter mechanism has been fully actuated, shutter actuation or film processing complete signal 146 is sent to AND gate 148. If switch $S_l$ has been actuated to its open position by a camera operator, signal $\overline{S}_l$ will be generated at its output and AND gate 150 will be rendered conductive because latching OR gate 126 is still in its conductive state, and the output from said OR gate 126 is present at the input of said AND gate 150. AND gate 148 will be rendered conductive upon receipt of completion signal 146 because AND gate 150 has been rendered conductive by the actuation of switch $S_l$ to its open position and the output of said AND gate 150 is connected to the input of AND gate 148 through OR gate 152. Signal $S_p$ is already present at the input of said AND gate 148 because switch $S_p$ was actuated to its closed position when variable focus lens 118 was moved toward its normal focusing range. When AND gate 148 is rendered conductive, a reverse drive signal is sent to drive motor 138 which, in turn, causes said drive motor to drive lens mount 140 toward its park position to the point where switch $S_p$ has been actuated to its open position by said lens mount 140 movement. When switch $S_p$ is actuated to its open position, signal $S_p$ will disappear from its output and AND gate 148 will be rendered nonconductive, thereby shutting off the reverse drive signal to drive motor 138. At this point, variable focus lens 118 is in its park position or in the position at which switch $S_p$ is open.

If swtich $S_p$ had been in its closed rather than in its open position when switch $S_I$ was initially closed, AND gate 154 rather than AND gate 122 would have been rendered conductive. Switch $S_p$ would be in said closed position if variable focus lens 118 had been manually focused by a camera operator. When switches $S_I$ and $S_p$ are both closed, signals $S_I$ and $S_p$ appear at the input to said AND gate 154. There is an output from inverter 156 because there is no output from latching OR gate 126 due to the lack of an output from AND gate 122, which would satisfy said AND gate 154. An output from AND gate 154 renders latching OR gate 158 conductive, said OR gate 158 remaining in its conductive state until it is reset. An output from latching OR gate 158 renders OR gate 144 conductive which, in turn, initiates a film exposure and processing cycle in the case of a self-processing film camera or merely actuates a conventional, electrically actuated shutter mechanism in the case of a nonself-processing film camera. Upon completion of film exposure, or of film exposure and processing, whichever the case might be, shutter actuation or film processing complete signal 146 is sent to AND gate 148. If switch $S_I$ has been actuated to its open position by a camera operator, thereby generating signal $\overline{S}_I$ at its output, AND gate 160 will be rendered conductive because latching OR gate 158 is still in its conductive state, and the output from OR gate 158 and said signal $\overline{S}_I$ is present at the input of said AND gate 160. AND gate 148 will be rendered conductive upon receipt of completion signal 146 because AND gate 160 was rendered conductive by the actuation of switch $S_I$ to its open position and the output of said AND gate 160 is present at the input of AND gate 148 through OR gate 152. Signal $S_p$ is already present at the input of said AND gate 148 because switch $S_p$ was actuated to its closed position when variable focus lens 118 was moved toward its normal focusing range. When AND gate 148 is rendered conductive, a reverse drive signal is sent to drive motor 138 which, in turn, causes said drive motor to drive lens mount 140 toward its park position to the point where switch $S_p$ is actuated to its open position by said lens mount 140 movement. When switch $S_p$ is eventually actuated to its open position, signal $S_p$ will disappear from its output and AND gate 148 will be rendered nonconductive, thereby shutting off the reverse drive signal to drive motor 138. At this point, variable focus lens 118 is in its park position or in the position at which switch $S_p$ is open.

With continued reference to FIG. 5, it should be noted that in addition to the control or logic signals provided by switches $S_I$ and $S_p$, these switches can also be utilized to disconnect any and all loads from the power source that is supplying power to terminal 120. The outputs of switches $S_I$ and $S_p$ are also fed to OR gate 162 and then to as many electrical loads as desired. When switch $S_I$ is eventually opened, power continues to be supplied to control system 116 and to any other selected loads through lens movement actuated switch $S_p$. However, when variable focus lens 118 is returned to its park position, switch $S_p$ is opened and all electrical loads that are receiving power through said switch $S_p$ and terminal 120 are disconnected.

If control system 76 (FIG. 4) focuses variable focus lens 77 on the subject to be photographed and a camera operator is able to view that subject as focusing is taking place, as in a single lens reflex camera, said camera operator may want the option of being able to prevent a picture from being taken after focusing is complete and prior to the initiation of a film exposure cycle. The focus control system depicted in FIG. 6 modifies the control system depicted in FIG. 4 such that switch $S_I$ is replaced by two switches or as an alternative, by a single switch having two stages. One switch or stage is primarily for the control of focusing and the other switch or stage is primarily for the control of picture taking.

Figure 6:
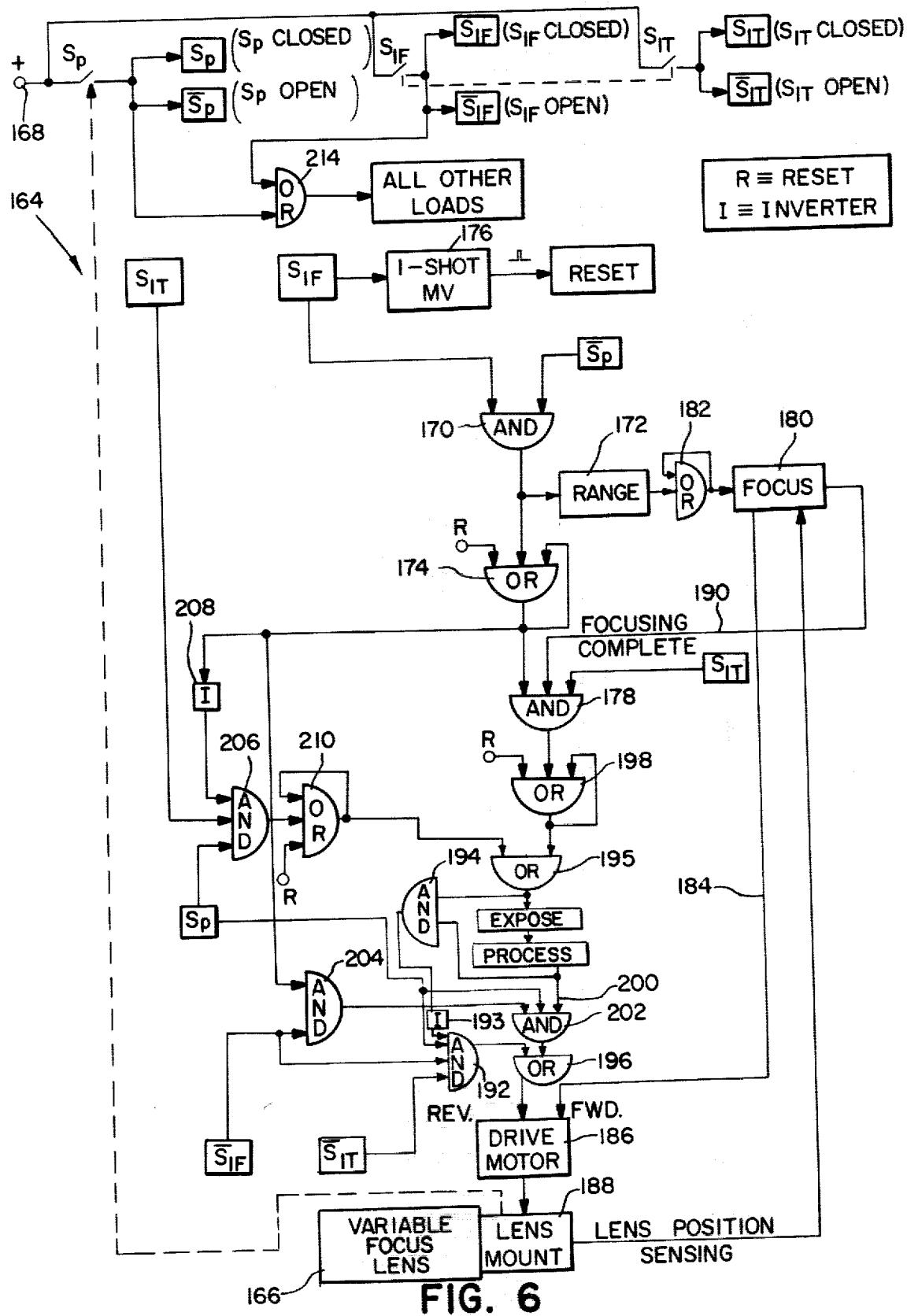
FIG. 6 is a schematic diagram of the control system depicted in FIG. 4 incorporating a two stage switch; one stage primarily for lens focusing and the other stage primarily for controlling a film exposure cycle.

In FIG. 6, focus control system 164 incorporating a two-stage switch, one stage primarily for lens focusing and the other stage primarily for controlling a film exposure cycle, and utilizing variable focus lens 166 movement outside of its normal focusing range, in accordance with a preferred embodiment of the present invention, is depicted. In control system 164, a source of electrical power (not shown) is supplied to one terminal of manually actuated, spring force biased, single pole switch $S_{IF}$, to one terminal of manually actuated, spring force biased, single pole switch $S_{IT}$ and to one terminal of lens movement actuated single pole switch $S_p$ through terminal 168, to which said source of power is connected. Switches $S_{IF}$ and $S_{IT}$ are mechanically linked to one another to form a two stage switch such that switch $S_{IF}$ must be closed before switch $S_{IT}$ can be closed. Either signal $S_{IF}$ or $\overline{S}_{IF}$ will appear at the output of switch $S_{IF}$ when said switch $S_{IF}$ is actuated. Signal $S_{IF}$ will appear at the output of switch $S_{IF}$ when switch $S_{IF}$ is closed and signal $\overline{S}_{IF}$ will appear at the output of switch $S_{IF}$ when said switch $S_{IF}$ is opened. Similarly, either signal $S_{IT}$ or signal $\overline{S}_{IT}$ will appear at the output of switch $S_{IT}$ when said switch $S_{IT}$ is actuated. Signal $S_{IT}$ will appear at the output of switch $S_{IT}$ when said switch $S_{IT}$ is closed and signal $\overline{S}_{IT}$ will appear at the output of switch $S_{IT}$ when said switch $S_{IT}$ is opened. Also, either signals $S_p$ or $\overline{S}_p$ will appear at the output of switch $S_p$ when said switch $S_p$ is actuated. Signal $S_p$ will appear at the output of switch $S_p$ when switch $S_p$ is closed and signal $\overline{S}_p$ will appear at the output of switch $S_p$ when said switch $S_p$ is opened.

Switch $S_{IF}$ primarily controls the automatic focusing of variable focus lens 166. When switch $S_{IF}$ is closed for focusing purposes thereby generating signal $S_{IF}$, AND gate 170 is rendered conductive if lens movement actuated switch $S_p$ is open or if lens 166 is in its park position as previously discussed. If said switch $S_p$ is open, signal $\overline{S}_p$ will appear at the input of AND gate 170 rendering said AND gate 170 conductive when said signal $\overline{S}_p$ is combined with signal $S_{IF}$. When AND gate 170 is rendered conductive, rangefinding means 172 is activated so that it can determine the distance to a subject to be photographed, said rangefinding means 172 functions in a manner similar to that of rangefinder 14 described above and depicted in FIG. 1. The output from AND gate 170 also renders latching OR gate 174 conductive. Latching OR gate 174 will remain conductive even if the input from AND gate 170 is removed, said OR gate 174 being rendered nonconductive only when switch $S_{IF}$ causes multivibrator 176 to generate a single reset pulse when said switch $S_{IF}$ is actuated to its closed position. The output of latching OR gate 174 is fed to the input of AND gate 178, said AND gate 178 being held in a nonconductive state until focusing means 180 has caused the positioning of variable focus lens 166 to the correct subject-in-focus position and switch $S_{IT}$ has been actuated to its closed position.

After the distance to a subject to be photographed has been determined by rangefinding means 172, a range complete signal is sent to latching OR gate 182 and the output of latching OR gate 182 is transmitted to focus control means 180 to initiate variable focus lens 166 focusing. Latching OR gate 182 maintains a focus initiate signal to focusing means 180 after focusing movement of variable focus lens 166 has caused the actuation of switch $S_p$ to its closed position which renders AND gate 170 nonconductive and deactivates rangefinding means 172 together with its focus initiating output. Focus control means 180 functions in a manner similar to focus control 35 (FIG. 1). Focus control means 180 sends drive forward signal 184 to drive motor 186 commanding said drive motor 186 to drive lens mount 188 together with variable focus lens 166 to the correct subject-in-focus position, said in-focus position to be sensed by lens position sensing means similar to that in said focus control system 35 (FIG. 1). Once focusing is complete, focus complete signal 190 is transmitted to AND gate 178. AND gate 178 will remain in a nonconductive state until switch $S_{IT}$ is actuated to its closed position for picture taking purposes. However, if a camera has determined that he does not want to initiate a film exposure cycle after focusing is complete, he would merely release or open switch $S_{IF}$ which would return variable focus lens 166 to its park position or to the switch $S_p$ open position. Movement of variable focus lens 166 to its park or $S_p$ open position under these conditions occurs because signals $\overline{S}_{IF}$ and $\overline{S}_{IT}$ are present at the input of AND gate 192 when switches $S_{IF}$ and $S_{IT}$ are in their open positions, and signal $S_p$ is already present at the input of AND gate 192 because switch $S_p$ was actuated to its closed position when variable focus lens 166 was moved toward its normal focusing range. In addition, there would be an output from inverter 193 because AND gate 194 would be in a nonconducting state due to a lack of an exposure initiate signal from OR gate 195. The function of AND gate 194 is to prevent variable focus lens 166 from being moved to its initial state before a film exposure cycle is complete. With signals $S_p$, $\overline{S}_{IF}$, $\overline{S}_{IT}$ and an output from inverter 193 present at the input of AND gate 192, said AND gate 192 is rendered conductive and transmits a reverse drive signal to drive motor 186 through OR gate 196, and said drive motor 186 drives lens mount 188 toward the lens 166 park position to the point where switch $S_p$ is actuated to its open position by said lens mount 188 movement in a manner similar to that in control system 10 described above and depicted in FIGS. 1 and 2. When switch $S_p$ is eventually actuated to its open position, signal $S_p$ will disappear from its output and AND gate 192 will be rendered nonconductive thereby shutting off the reverse drive signal to drive motor 186. At this point, variable focus lens 166 is in its park position or in the position at which switch $S_p$ is open.

If, on the other hand, switch $S_{IT}$ is actuated to its closed position when focus complete signal 190 is present at the input of AND gate 178, signal $S_{IT}$ will appear at the output of switch $S_{IT}$ and AND gate 178 will be rendered conductive. The output from AND gate 178 causes latching OR gate 198 to conduct and the output from latching OR gate 198 causes OR gate 195 to conduct. The output from OR gate 195 actuates a shutter mechanism which exposes and subsequently initiates the processing of an instant developing film such as that utilized in the self-processing film camera mentioned above. In a camera where instant film is not utilized, the output from OR gate 195 would merely trigger a conventional, electrically actuated shutter mechanism. Once processing is complete, or in the case of a nonself-processing film camera, once the shutter mechanism has been fully actuated, shutter actuation completion or film processing complete signal 200 is sent to AND gate 202. If switch $S_{IF}$ has been released or actuated to its open position by a camera operator, signal $\overline{S}_{IF}$ will be generated at its output and AND gate 204 will be rendered conductive because latching OR gate 174 is still in its conductive state and the output from said OR gate 174 is present at the input of said AND gate 204 together with signal $\overline{S}_{IF}$. AND gate 202 will be rendered conductive upon receipt of completion signal 200 because AND gate 204 has been rendered conductive by the actuation of switch $S_{IF}$ to its open position and signal $S_p$ is already present at the input of said AND gate 202 because switch $S_p$ was actuated to its closed position when variable focus lens 166 was initially moved toward its normal focusing range. When AND gate 202 is rendered conductive, a reverse drive signal is sent to drive motor 186 through OR gate 196 which causes said motor to drive lens mount 188 toward its initial or park position until switch $S_p$ is actuated to its open position. When switch $S_p$ is eventually actuated to its open position, signal $S_p$ will disappear from its output and gate 202 will be rendered nonconductive thereby shutting off the reverse drive signal to drive motor 186. At this point, variable focus lens 166 is in its park position or in the position at which switch $S_p$ is open.

If switch $S_p$ had been in its closed rather than in its open position when switch $S_{IF}$ was initially closed, AND gate 170 would not have been rendered conductive and focusing by focus control means 180 would not have occurred. Switch $S_p$ would be in said closed position if variable focus lens 166 had been manually focused by a camera operator. In order to initiate a picture taking sequence in this situation, switch $S_{IT}$ must be closed. With switches $S_{IT}$ and $S_p$ both closed, signals $S_{IT}$ and $S_p$ would appear at the input of gate 206. There would be an output from inverter 208 because there would be no output from latching OR gate 174 due to the lack of an output from AND gate 170. An output from AND gate 206 renders latching OR gate 210 conductive, said OR gate 210 remaining in its conductive state until it is reset as previously discussed. An output from latching OR gate 210 renders OR gate 195 conductive which, in turn, initiates a film exposure and processing cycle in the case of a self-processing film camera or merely actuates a conventional, electrically actuated shutter mechanism in the case of a nonself-processing film camera.

Upon completion of film exposure or of film exposure and processing, each of which are herein referred to as a film exposure cycle, whichever the case might be, completion signal 200 will render AND gate 194 conductive which will result in no output from inverter 193 and in variable focus lens 166 remaining at its subject-in-focus position.

With continued reference to FIG. 6, it should be noted that in addition to the control or logic signals provided by switches $S_{IF}$ and $S_p$, these switches can also be utilized to disconnect any and all loads from the power source that is supplying power to terminal 168. The outputs of switches $S_{IF}$ and $S_p$ are also fed to OR gate 214 and then to as many electrical loads as desired. When switch $S_{IF}$ is eventually opened, power continues to be supplied to control system 164, and to any other selected loads, through lens movement actuated switch $S_p$. However, when variable focus lens 166 is eventually returned to its park position, switch $S_p$ is opened and all electrical loads that are receiving power through switch $S_p$ and terminal 168 are disconnected.

If control system 116 depicted in FIG. 5 focuses variable focus lens 118 on a subject to be photographed and a camera operator is able to view that subject as focusing is taking place, as in a single lens reflex camera, said camera operator may want the option of being able to prevent a picture from being taken after focusing is complete and prior to the initiation of a film exposure cycle. The focus control system depicted in FIG. 7 modifies the focus control system depicted in FIG. 5 such that switch $S_I$ is replaced by two switches or, as an alternative, by a single switch having two stages. One switch or stage is primarily for the control of focusing and the other switch or stage is primarily for the control of picture taking.

Figure 7:
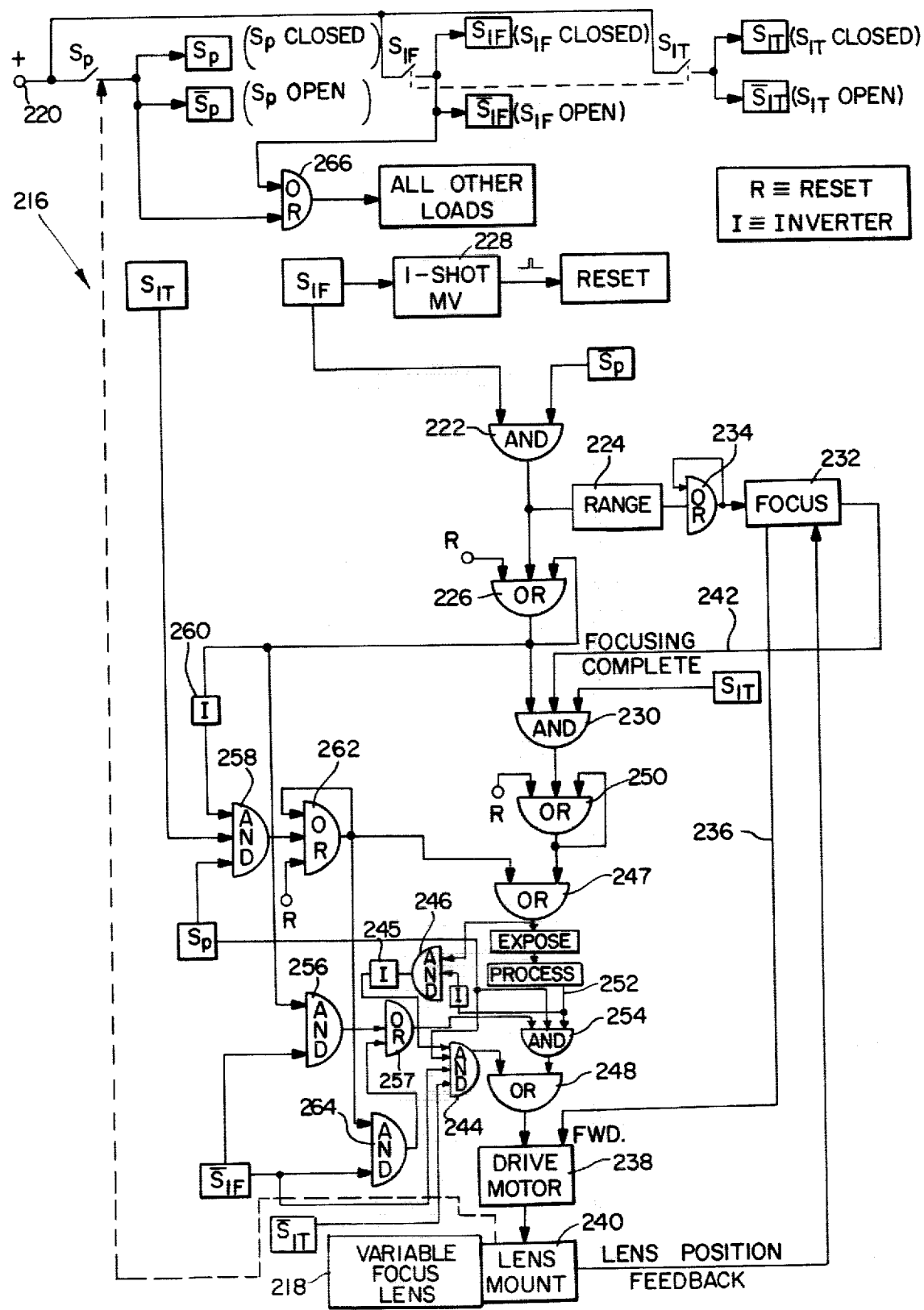
FIG. 7 is a schematic diagram of the control system depicted in FIG. 5 incorporating a two stage switch; one stage primarily for lens focusing and the other stage primarily for controlling a film exposure cycle.

In FIG. 7, focus control system 216 incorporating a two-stage switch, one stage primarily for lens focusing and the other stage primarily for controlling a film exposure cycle, and utilizing variable focus lens 218 movement outside of its normal focusing range, in accordance with a preferred embodiment of the present invention, is depicted. In control system 216, a source of electrical power (not shown) is supplied to one terminal of manually actuated, spring force biased single pole switch $S_{IF}$, to one terminal of manually actuated, spring force biased, single pole switch $S_{IT}$ and to one terminal of lens movement actuated single pole switch $S_p$ through terminal 220, to which said source of power is connected. Switches $S_{IF}$ and $S_{IT}$ are mechanically linked to one another to form a two-stage switch such that switch $S_{IF}$ must be closed before switch $S_{IT}$ can be closed. Either signal $S_{IF}$ or $\overline{S}_{IF}$ will appear at the output of switch $S_{IF}$ when said switch $S_{IF}$ is actuated. Signal $S_{IF}$ will appear at the output of switch $S_{IF}$ when switch $S_{IF}$ is closed and signal $\overline{S}_{IF}$ will appear at the output of switch $S_{IF}$ when said switch $S_{IF}$ is opened. Similarly, either signal $S_{IT}$ or $\overline{S}_{IT}$ will appear at the output of switch $S_{IT}$ when said switch $S_{IT}$ is actuated. Signal $\overline{S}_{IT}$ will appear at the output of switch $S_{IT}$ when switch $S_{IT}$ is closed and signal $\overline{S}_{IT}$ will appear at the output of switch $S_{IT}$ when said switch $S_{IT}$ is opened. Also, either signals $S_p$ or $\overline{S}_p$ will appear at the output of switch $S_p$ when said switch $S_p$ is actuated. Signal $S_p$ will appear at the output of switch $S_p$ when $S_p$ is closed and signal $\overline{S}_p$ will appear at the output of switch $S_p$ when said switch $S_p$ is open.

Switch $S_{IF}$ primarily controls the automatic focusing of variable focus lens 218. When switch $S_{IF}$ is closed for focusing purposes thereby generating signal $S_{IF}$ at its output, AND gate 222 is rendered conductive if lens movement actuated switch $S_p$ is open or if lens 218 is in its park position as previously discussed. If said switch $S_p$ is open, signal $\overline{S}_p$ will appear at the input of AND gate 222 rendering said AND gate 222 conductive when said signal $\overline{S}_p$ is combined with signal $S_{IF}$. When AND gate 222 is rendered conductive, rangefinding means 224 is activated so that it can determine the distance to a subject to be photographed, said rangefinding means 224 functioning in a manner similar to that of rangefinder 14 described above and depicted in FIG. 1. The output from AND gate 222 also renders latching OR gate 226 conductive. Latching OR gate 226 will remain conductive even if the input from AND gate 222 is removed, said OR gate 226 being rendered nonconductive only when switch $S_{IF}$ causes multivibrator 228 to generate a single reset pulse when said switch $S_{IF}$ is actuated to its closed position. The output of latching OR gate 226 is fed to the input of AND gate 230, and AND gate 230 being held nonconductive until focusing means 232 has caused the positioning of variable focus lens 218 to the correct subject-in-focus position and switch $S_{IT}$ has been actuated to its closed position.

After the distance to a subject to be photographed has been determined by rangefinding means 224, a range complete signal is sent to latching OR gate 234 and the output of latching OR gate 234 is transmitted to focus control means 232 to initiate variable focus lens 218 focusing. Latching OR gate 234 maintains a focus initiate signal to focusing means 232 after focusing movement of variable focus lens 218 has caused the actuation of switch $S_p$ to its closed position which renders AND gate 222 nonconductive and deactivates rangefinding means 224 together with its focus initiating output. Focus control means 232 functions in a manner similar to focus control 35 described in some detail above and depicted in FIG. 1. Focus control means 232 sends drive forward signal 236 to drive motor 238 commanding said drive motor 238 to drive lens mount 240 together with variable focus lens 218 to the correct subject-in-focus position, said in-focus position to be sensed by lens position sensing means similar to that in said focus control system 35 (FIG. 1). Once focusing is complete, focus complete signal 242 is transmitted to AND gate 230. AND gate 230 will remain in a nonconductive state until switch $S_{IT}$ is actuated to its closed position for the purpose of initiating a film exposure cycle. However, if a camera operator has determined that he does not want to initiate a film exposure cycle after focusing is complete, he would merely release or open switch $S_{IF}$ which would return variable focus lens 218 to its park position or to its switch $S_p$ open position. Movement of variable focus lens 218 to its park or $S_p$ open position under these conditions occurs because signals $\overline{S}_{IF}$ and $\overline{S}_{IT}$ are present at the input of AND gate 244 when switches $S_{IF}$ and $S_{IT}$ are in their open positions, and signal $S_p$ is already present at the input of AND gate 244 because switch $S_p$ was actuated to its closed position when variable focus lens 218 was moved toward its normal focusing range. In addition, there would be an output from inverter 245 because AND gate 246 would be in a nonconducting state due to a lack of an exposure initiate signal from OR gate 247. The function of AND gate 246 is to prevent variable focus lens 218 from being moved back to its initial state before a film exposure cycle is complete. With signals $S_p$, $\overline{S}_{IF}$, $\overline{S}_{IT}$ and an output from inverter 245 present at the input of AND gate 244, said AND gate 244 is rendered conductive and transmits a reverse drive signal to drive motor 238 through OR gate 248, and said drive motor 238 drives lens mount 240 toward the lens 218 park position to the point where switch $S_p$ is actuated to its open position by said lens mount 240 movement in a manner similar to that in control system 10 described above and depicted in FIGS. 1 and 2. When switch $S_p$ is eventually actuated to its open position, signal $S_p$ will disappear from its output and AND gate 244 will be rendered nonconductive thereby shutting off the reverse drive signal to drive motor 238. At this point, variable focus lens 218 is in its park position or in the position at which switch $S_p$ is open.

If, on the other hand, switch $S_{IT}$ is actuated to its closed position when focus complete signal 242 is present at the input of AND gate 230, signal $S_{1T}$ will appear at the output of switch $S_{1T}$ and AND gate 230 will be rendered conductive. The output from AND gate 230 causes latching OR gate 250 to conduct and the output from said latching OR gate 250 causes OR gate 247 to conduct. The output from OR gate 247 actuates a shutter mechanism which exposes and subsequently initiates the processing of an instant developing film such as that utilized in the self-processing film camera mentioned above. In a camera where self-processing film is not utilized, the output from OR gate 247 would merely trigger a conventional, electrically actuated shutter mechanism. Once processing is complete, or in the case of a nonself-processing film camera, once the shutter mechanism has been fully actuated, shutter actuation completion or film processing complete signal 252 is sent to AND gate 254. If switch $S_{1F}$ has been released or actuated to its open position by a camera operator, signal $\overline{S}_{1F}$ will be generated at its output and AND gate 256 will be rendered conductive because latching OR gate 226 is still in its conductive state and the output from said OR gate 226 is present at the input of said AND gate 256 together with said signal $\overline{S}_{1F}$. AND gate 254 will be rendered conductive upon receipt of completion signal 252 because AND gate 256 has been rendered conductive by the actuation of switch $S_{1F}$ to its open position and signal $S_p$ is already present at the input of said AND gate 254 because switch $S_p$ was actuated to its closed position when variable focus lens 218 was moved toward its normal focusing range. When AND gate 254 is rendered conductive, a reverse drive signal is sent to drive motor 238 through OR gate 248 which causes said motor to drive lens mount 240 toward its initial or park position until switch $S_p$ is actuated to its open position. When switch $S_p$ is eventually actuated to its open position, signal $S_p$ will disappear from its output and gate 254 will be rendered nonconductive thereby shutting off the reverse drive signal to drive motor 238. At this point, variable focus lens 218 is in its park position or in the position at which switch $S_p$ is open.

If switch $S_p$ had been in its closed rather than in its open position when switch $S_{1F}$ was initially closed, AND gate 222 would not have been rendered conductive and focusing by focus control means 232 would not have occurred. Switch $S_p$ would be in said closed position if variable focus lens 218 had been manually focused by a camera operator. In order to initiate a picture taking sequence in this situation, switch $S_{1T}$ must be closed. With switches $S_{1T}$ and $S_p$ both closed, signals $S_{1T}$ and $S_p$ would appear at the input of gate 258. There would be an output from inverter 260 because there would be no output from latching OR gate 226 due to the lack of an output from AND gate 222. An output from AND gate 258 renders latching OR gate 262 conductive, said OR gate 262 remaining in its conductive state until it is reset as previously discussed. An output from latching OR gate 262 renders OR gate 247 conductive which, in turn, initiates a film exposure and processing cycle in the case of a self-processing film camera or merely actuates a conventional, electrically actuated shutter mechanism in the case of a nonself-processing film camera.

Upon completion of film exposure or of film exposure and processing, each of which are herein referred to as a film exposure cycle, whichever the case might be, completion signal 252 will render AND gate 254 conductive if switch $S_{1F}$ has been actuated to its open position. With switch $S_{1F}$ in its open position, signal $\overline{S}_{1F}$ appears at its output and at the input of AND gate 264. When signal $\overline{S}_{1F}$ appears at the input to AND gate 264, said AND gate 264 will conduct because the output from previously latched latching OR gate 262 is also present at the input to said AND gate 264. The output of conducting AND gate 264 will appear at the input of AND gate 254 when OR gate 257 is rendered conductive by an output from said AND gate 264. Signal $S_p$ is already present at the input of AND gate 254 because switch $S_p$ was actuated to its closed position when variable focus lens 218 was moved toward its normal focusing range. When AND gate 254 is rendered conductive, a reverse drive signal is sent to drive motor 238 through OR gate 248 which causes said drive motor to drive lens mount 240 toward its initial or park position until switch $S_p$ has been actuated to its open position by said lens mount 248. OR gate 248 would also be rendered conductive by AND gate 244 because if switch $S_{1F}$ is open, switch $S_{1T}$ must also be open and therefore signals $\overline{S}_{1F}$, $\overline{S}_{1T}$, and $S_p$ together with an output from inverter 245 will appear at the input of said AND gate 244, rendering said AND gate 244 conductive. There will be an output from AND gate 246 when a film exposure cycle is complete which will render said AND gate nonconductive which will result in an output from said inverter 246. When switch $S_p$ is eventually actuated to its open position, signal $S_p$ will disappear from its output and AND gates 244 and 254 will be rendered nonconductive, thereby shutting off the reverse drive signal to drive motor 238. At this point, variable focus lens 218 is in its park position or in the position at which $S_p$ is open.

With continued reference to FIG. 7, it should be noted that in addition to the control or logic signals provided by switches $S_{1F}$ and $S_p$, these switches can also be utilized to disconnect any and all loads from the power source that is supplying power to terminal 220. The outputs of switches $S_{1F}$ and $S_p$ are also fed to OR gate 266 and then to as many electrical loads as desired. When switch $S_{1F}$ is eventually opened, power continues to be supplied to control system 216, and to any other selected loads, through lens movement actuated switch $S_p$. However, when variable focus lens 218 is eventually returned to its park position, switch $S_p$ is opened and all electrical loads that are receiving power through switch $S_p$ and terminal 220 are disconnected.

GENERAL CONSIDERATIONS

A variable focus lens includes both fixed and movable lens elements for variable focus lens focusing. In a conventional variable focus lens, the movable lens element is movable between both ends of its focusing range for focusing purposes. In such a conventional lens, movement of the movable lens element a significant distance outside of its normal focusing range would normally bring said movable element into physical contact with a relatively fixed lens element. The focal characteristics of a conventional variable focus lens must be modified to obtain additional clearance between fixed and movable variable focus lens elements in order to incorporate the inventive concept of the present invention.

Lens actuated switch $S_p$, which may be of the mechanical or solid state type or some combination of each, may be directly actuated by lens movement outside of its normal focusing range as described above or may be indirectly actuated by means that sense or react to such lens movement.

The variable focus lens control systems depicted herein are functionally represented in but one of a number of possible alternate representations. In addition, these functions are not necessarily represented by the least number of functional blocks or the actual manner in which these functional blocks must be combined. AND gates, OR gates, latching OR gates and inverters are the basic functional blocks that are utilized in the functionally represented control systems depicted herein. An AND gate block will have a output so long as all of its inputs are present. An OR gate block will have an output so long as any of its inputs are present. A latching OR gate block continues to have an output once any input is present, even when all such inputs are removed. The output from a latching OR gate can only be removed by resetting said latching OR gate after all inputs have been removed in a manner such as that described above. An inverter will have an output whenever it has no input and will have no output whenever it does have an input.

Switches $S_{1F}$ and $S_{1T}$ depicted herein have been described as either two switches or a single switch having two stages that are mechanically interlocked and are spring force biased to their open positions such that the switch or stage representing switch $S_{1F}$ must be actuated to its closed position before the switch or stage representing switch $S_{1T}$ can be actuated to its closed position. An alternate arrangement for switches $S_{1F}$ and $S_{1T}$ might be to permit either switch $S_{1F}$ or $S_{1T}$ to be actuated to its closed position first. However, the output from switch $S_{1T}$ would be electrically inhibited until there was an output from switch $S_{1F}$. Switches $S_{1F}$ and $S_{1T}$, whether two switches or two stages of a single switch, are mounted on a camera housing such that said switch or switches are readily accessible for manual actuation by a camera operator.

The term normal focusing range as used herein means that focusing range that is actually being utilized by the variable focus lens, and said normal focusing range may be equal to or less than the complete focusing range of said variable focus lens.

It will be apparent to those skilled in the art from the foregoing description of my invention that various improvements and modifications can be made in it without departing from its true scope. The embodiments described herein are merely illustrative and should not be viewed as the only embodiments that might encompass my invention.

What is claimed is:

1. A camera having an image plane and comprising:
   means for selectively coupling said camera to a source of electrical energy;
   a lens mounted for displacement over a given operational range wherein it alternately serves to focus images of subjects positioned in various locations within a normal range of selectable subject distances at said image plane, and also for displacement outside of its said given operational range into another range wherein it does not serve to focus images of subjects positioned within said normal selectable subject distance range at said image plane, said lens being normally located within its said other range when said camera is inoperative;
   means for producing a signal indicative of the position of a particular subject, within said normal selectable subject distance range, selected to be photographed; and
   drive means responsive to said signal for effecting the movement of said lens from its normally inoperative position within its said other range into its position within its said operational range wherein it serves to focus an image of the particular subject at said image plane to facilitate the recording of an image of the particular subject on film located at said image plane.

2. The camera of claim 1 wherein said drive means includes means for automatically returning said lens to its said normally inoperative position within its said other range subsequent to its serving to focus an image of the particular subject at said image plane.

3. The camera of claim 1 including means for sensing when said lens has moved from its said normally inoperative position within its said other range toward its said focused position within its said operational range under the influence of said drive means whereby said sensing means may be utilized to control the operation of a selected camera function.

4. The camera of claim 3 wherein said sensing means is arranged to sense when the said lens has moved from its said normally inoperative position before said lens has reached its said operational range.

5. The camera of claim 3 wherein said sensing means additionally senses when said lens is returning or returned from its said operative range to its said normally inoperative position under the influence of said drive means whereby said sensing means may be utilized to control the operation of a selected camera function at such time.

6. The camera of claim 5 wherein said sensing means senses that said lens is returning to its said normally inoperative position when said lens is in its said other range.

7. The camera of claim 2 including means for sensing when said lens is returning or returned from the said operative range to its said normally inoperative position under the influence of said drive means whereby said sensing means may be utilized to control the operation of a selected camera function.

8. The camera of claim 1 wherein said coupling means serves to energize both said signal producing means and said drive means with power from the source of electrical energy.

9. The camera of claim 2 wherein said coupling means includes a manually accessible actuator mounted for displacement between a normally inoperative position and a second position, means for urging said actuator towards its said normally inoperative position and a normally non-conductive first switch operably associated with said actuator so as to be rendered conductive to energize said drive means as said actuator is displaced from its said inoperative position to its said second position and again non-conductive when said actuator is returned to its said inoperative position under the influence of said actuator urging means, and wherein said drive means includes a second normally non-conductive switch and means responsive to the movement of said lens from its normally inoperative position towards its said focusing position within its said operational range for coupling said drive means to the source of electrical energy thereby effecting the return movement of said lens to its said normally inoperative position within its said other range after said lens has served to focus an image of the particular subject at the image plane and under conditions when said actuator has returned to its said inoperative position rendering said second switch non-conductive prior to said lens returning to its said inoperative position.

10. The camera of claim 1 wherein said camera additionally includes an actuable exposure shutter and wherein said coupling means includes a manually accessible actuator mounted for displacement between a normally inoperative position through a second position to a third position, means for urging said actuator towards its said normally inoperative position, a normally non-conductive first switch operably associated with said actuator so as to be rendered conductive to energize said drive means when said actuator is displaced from its said inoperative position into its said second position and again non-conductive when said actuator is returned to its said inoperative position under the influence of said urging means and a normally non-conductive second switch operably associated with said actuator so as to be rendered conductive to actuate said shutter when said actuator is displaced from its said second position into its said third position and again non-conductive when said actuator is returned to its said inoperative position whereby said lens is displaced by said drive means from its said inoperative position into its said focused position, responsive to said actuator being displaced from its said inoperative position into its said second position and back to its said inoperative position, to effect the focusing of said lens without causing said shutter to be actuated.

11. The camera of claim 8 wherein said signal producing means is automatically responsive to being energized from the source of electrical energy and said camera additionally includes an actuable exposure shutter and wherein said coupling means includes a manually accessible actuator mounted for displacement between a normally inoperative position through a second position to a third position, means for urging said actuator towards its said normally inoperative position, a normally non-conductive first switch operably associated with said actuator so as to be rendered conductive to energize both said signal producing means and said drive means as said actuator is displaced from its said inoperative position into its said second position and again non-conductive when said actuator is returned to its said inoperative position under the influence of said urging means and a second normally non-conductive switch operably associated with said actuator so as to be rendered conductive to actuate said shutter when said actuator is displaced from its said second position into its said third position and again non-conductive when said actuator is returned to its said inoperative position whereby said signal producing means is rendered operative and said lens is automatically displaced by said drive means from its said inoperative position into its said focus position, responsive to said actuator being displaced from its said inoperative position into its said second position and back to its said inoperative position, to effect the focusing of said lens without causing said shutter to be actuated.

12. The camera of claim 2 wherein said camera additionally includes an actuable exposure shutter and wherein said coupling means includes a manually accessible actuator mounted for displacement between a normally inoperative position through a second position to a third position, means for urging said actuator towards its said normally inoperative position, a normally non-conductive first switch operably associated with said actuator so as to be rendered conductive to energize said drive means when said actuator is displaced from its said inoperative position into its said second position and again non-conductive when said actuator is returned to its said inoperative position under the influence of said urging means and a normally non-conductive second switch operably associated with said actuator so as to be rendered conductive to actuate said shutter when said actuator is displaced from its said second position into its said third position and again non-conductive when said actuator is returned to its said inoperative position whereby said lens is displaced by said drive means from its said inoperative position into its said focused position and back to its said inoperative position responsive to said actuator being displaced form its said inoperative position into its said second position and back to its said inoperative position, to effect the focusing of said lens without causing said shutter to be actuated.

13. A camera having an image plane and comprising:
a manually focusable lens mounted for displacement over a given operational range wherein it alternately serves to focus images of subjects positioned in various locations within a normal range of selectable subject distances at said image plane, and also for displacement outside of its said given operational range and into another range wherein it does not serve to focus images of subjects positioned within said normal selectable subject distance range at said image plane, said lens being normally located within its said other range when said camera is inoperative;

a shutter;

energizable first means for determining the distance between said camera and the position of a particular subject, within said normal selectable subject distance range, selected to be photographed, for producing a signal indicative of said particular subject distance and, responsive to said signal, for effecting the movement of said lens from its normally inoperative position within its said other range into its position within its said operational range wherein it serves to focus an image of the particular subject at said image plane, for then actuating said shutter to record an image of the particular subject on film located at said image plane and for subsequently automatically returning said lens to its said normally inoperative position within its said other range;

manually accessible and actuable second means for selectively energizing said first means from a source of electrical energy; and third means for sensing when said lens has been manually displaced from its said normally inoperative position within its said other range into its said operational range and for altering the response of said first means to subsequent manual actuations of said second means, until such time as said lens is manually returned to its said other range, to ffect actuations of said shutter without effecting movement of said lens.

14. The camera of claim 13 wherein said third means includes means for altering the response of said first means to subsequent manual actuations of said second means, until such time as said lens is manually returned to its said other range, to effect actuations of said shutter without determining the distance between said camera and the position of the particular subject and without effecting movement of said lens.

15. The camera of claim 13 wherein said third means includes a normally non-conductive switch and means for rendering said switch conductive as said lens moves within said other range from its said normally inoperative position towards its said operational range and for rendering said switch again non-conductive when said lens returns again from its said operational range into its said other range.

16. The camera of claim 13 wherein said second means includes a manually accessible actuator mounted for displacement between a normally inoperative position through a second position to a third position, means for urging said actuator towards its said normally inoperative position, a normally non-conductive first switch operably associated with said actuator so as to be rendered conductive, to energize said first means to determine the distance between said camera and the position of the particular subject, to produce said signal and for effecting said movement of said lens into its said focused position without actuating said shutter, when said actuator is displaced from its said inoperative position into its said second position and again non-conductive when said actuator is returned to its said inoperative position under the influence of said urging means and a normally non-conductive second switch operably associated with said actuator so as to be rendered conductive to actuate said shutter when said actuator is displaced from its said second position into its said third position and again non-conductive when said actuator is returned to its said inoperative position whereby said lens is displaced by said first means from its said inoperative position into its said focused position, responsive to said actuator being displaced from its said inoperative position into its said second position and back to its said inoperative position, to effect the focusing of said lens without causing said shutter to be actuated.

17. The camera of claim 16 wherein said second means includes means responsive to said actuator being returned from its said second position to its normally inoperative position for returning said lens from its said focused position to its said normally inoperative position.

18. A camera having an image plane and comprising:
a manually focusable lens mounted for displacement over a given operational range wherein it alternately serves to focus images of subjects positioned in various locations within a normal range of selectable subject distances at said image plane, and also for displacement outside of its said given operational range and into another range wherein it does not serve to focus images of subjects positioned within said normal selectable subject distance range at said image plane, said lens being normally located within its said other range when said camera is inoperative;
a shutter;
energizable first means for determining the distance between said camera and the position of a particular subject, within said normal selectable subject distance range, selected to be photographed, for producing a signal indicative of said particular subject distance and, responsive to said signal, for effecting the movement of said lens from its normally inoperative position within its said other range into its position within its said operational range wherein it serves to focus an image of the particular subject at said image plane, for then actuating said shutter to record an image of the particular subject on film located at said image plane and for subsequently automatically returning said lens to its said normally inoperative position within its said other range;
manually accessible and actuable second means for selectively energizing said first means from a source of electrical energy; and
third means for sensing when said lens has been manually displaced from its said normally inoperative position within its said other range into its said operational range and for altering the response of said first means to the next manual actuation of said second means to effect the actuation of said shutter and the subsequent return of said lens to its said normally inoperative position within its said other range without effecting movement of said lens into a focused position responsive to said signal.

19. The camera of claim 18 wherein said third means includes means for altering the response of said first means to said next manual actuation of said second means to effect the actuation of said shutter without determining the distance between said camera and the position of the particular subject, without producing said signal and without effecting movement of said lens into a focused position responsive to said signal.

20. The camera of claim 18 wherein said third means includes a normally non-conductive switch and means for rendering said switch conductive as said lens moves within said other range from its said normally inoperative position towards its said operational range and for rendering said switch again non-conductive when said lens returns again from its said operational range into its said other range.

21. The camera of claim 18 wherein said second means includes a manually accessible actuator mounted for displacement between a normally inoperative position through a second position to a third position, means for urging said actuator towards its said normally inoperative position, a normally non-conductive first switch operably associated with said actuator so as to be rendered conductive to energize said first means to determine the distance between said camera and the position of the particular subject, producing said signal and for effecting said movement of said lens into its said focused position without actuating said shutter when said actuator is displaced from its said inoperative position into its said second position and again non-conductive when said actuator is returned to its said inoperative position under the influence of said urging means and a normally non-conductive second switch operably associated with said actuator so as to be rendered conductive to actuate said shutter when said actuator is displaced from its said second position into its said third position and again non-conductive when said actuator is returned to its said inoperative position whereby said lens is displaced by said first means from its said inoperative position into its said focused position, responsive to said actuator being displaced from its said inoperative position into its said second position and back to its said inoperative position, to effect the focusing of said lens without causing said shutter to be actuated.

22. The camera of claim 21 wherein said second means includes means responsive to said actuator being returned from its said second position to its normally inoperative position for returning said lens from its said focused position to its said normally inoperative position.

23. A unidirectional focus control system for a variable focus lens comprising:
- a first switch manually actuatable between an initial state and a second state, for selectively coupling said focus control system to a source of energy;
- a variable focus lens, said lens being adjustable between a first region where it can focus an image of an object at an image plane for viewing purposes and a second region where said image cannot be so focused at said image plane;
- a second switch, actuatable in said second region between an initial state and a second state in response to the movement of said lens as said lens moves in said second region;
- a rangefinder for deriving a signal representative of the actual distance between a reference point associated with said focus control system and an object remote therefrom, said rangefinder being rendered operative by the actuation of said first switch to its said second state if said second switch is in its said initial state;
- an actuator, operatively coupled to said variable focus lens, for moving said variable focus lens from said second region to said first region in response to the actuation of said first switch means to its said second state and said rangefinder derived distance signal, if said second switch means is in its said first state, and for moving said variable focus lens from said first region to said second region in response to the actuation of said first switch means to its said initial state if said second switch means is in its said second state, the actuation of said second switch means by the movement of said lens from said first region to said second region limiting the actuating force supplied by said actuator;
- means for sensing that said lens has moved at least a minimum distance withing said second region to a position within said first region where an image of said remote object is in focus at said image plane; and
- means responsive to said lens position sensing means for stopping the movement of said lens in said first region at said object-in-focus position.

24. A control system as defined in claim 23, wherein said lens movement sensing means comprises:
- means for deriving a signal representative of variable focus lens focusing movement; and
- means for generating a signal representative of the combination of said lens movement signal and said rangefinder derived signal when said combination signal reaches a predetermined value, said predetermined combination signal indicating that said variable focus lens focusing is complete.

25. A control system as defined in claim 24, wherein said means for deriving a signal representative of variable focus lens focusing movement is an encoder gear mounted in a fixed relation with respect to a portion of and having a known relationship with respect to the focal length of said variable focus lens, said encoder gear having equally spaced openings positioned a fixed radial distance from a relatively fixed point, said openings cooperating with light emitting and light sensitive devices to periodically block and unblock light transmitted by said light emitting device to said light sensitive device, each combination of said light blocking and unblocking causing the generation of a pulse, the sum total of such pulses being respresentative of the focal position of said variable focus lens, and wherein said means for generating said focusing complete signal is a pulse counter and a decoder, said decoder providing an output indicating that focusing is complete when the pulses counted by said pulse counter reaches a predetermined value.

26. A control system as defined in claim 25, wherein said means for stopping the movement of said lens at said in-focus position is a relay actuated pawl, the actuation of said relay causing said pawl to engage and stop the motion of said encoder gear.

27. A control system as defined in claim 25, wherein said second switch is actuated between its said initial and second states before any openings in said encoder gear cooperate with said light emitting and said light sensitive devices for pulse generation purposes.

28. A control system as defined in claim 23, wherein said actuator is an electrical motor and said motor is mechanically coupled to said variable focus lens through a gear train, at least one gear in said gear train being mounted in a fixed position with respect to a movable portion of said variable focus lens, said fixedly mounted gear being mounted for rotation about the principle image forming axis of said variable focus lens.

29. A photographic camera comprising:
- a first switch manually actuatable between an initial state and a second state for selectively coupling said camera to a source of energy;
- a housing member, said member enclosing a film plane in a light-tight exposure chamber;
- a shutter mechanism, mounted on said housing, for admitting, and precluding the admission of image containing light rays to said film plane;
- a variable focus lens mounted on said housing member, said lens being movable between a first region where it can focus an image of a subject at said film plane for picture taking purposes and a second region where said image cannot be so focused at said film plane without repositioning said camera;
- a second switch, actuatable between an intial state and a second state in response to movement of said lens as said lens moves in said second region;
- a rangefinder for deriving a signal representative of the actual distance between said camera and an object remote therefrom, said rangefinder being rendered operative by the actuation of said first switch to its said second state if said second switch is in its said initial state;
- an actuator, operatively coupled to said variable focus lens, for moving said lens from said second region to said first region in response to the actuation of said first switch to its said second state and said rangefinder derived distance signal, if said second switch is in said initial state, and from said first region to said second region in response to the actuation of said first switch to its said initial state and the actuation of said shutter mechanism, if said second switch is in said second state, the actuation of said second switch by the movement of said lens from said first region to said second region limiting the actuating force supplied by said actuator;
- means for sensing that said lens has moved at least a minimum distance within said second region to a position within said first region where an image of said subject is in focus at said film plane;
- means responsive to said lens movement sensing means for stopping the movement of said lens in said first region at said subject-in-focus position; and means responsive to said lens movement sensing means for actuating said shutter mechanism at said subject-in-focus position.

30. A control system as defined in claim 29, wherein said lens movement sensing means comprises:
   means for deriving a signal representative of variable focus lens focusing movement; and
   means for generating a signal representative of the combination of said lens movement signal and said rangefinder derived signal when said combination signal reaches a predetermined value, said predetermined combination signal indicating that said variable focus lens focusing is complete.

31. A control system as defined in claim 30, wherein said means for deriving a signal representative of variable focus lens focusing movement is an encoder gear mounted in a fixed relation with respect to a portion of and having a known relationship with respect to the focal length of said variable focus lens, said encoder gear having equally spaced openings positioned a fixed radial distance from a relatively fixed point, said openings cooperating with light emitting and light sensitive devices to periodically block and unblock light transmitted by said light emitting device to said light sensitive device, each combination of said light blocking and unblocking causing the generation of a pulse, the sum total of such pulses being representative of the focal position of said variable focus lens, and wherein said means for generating said focusing complete signal is a pulse counter and a decoder, said decoder providing an output indicating that focusing is complete when the pulses counted by said pulse counter reaches a predetermined value.

32. A control system as defined in claim 31, wherein said means for stopping the movement of said lens at said subject-in-focus position is a relay actuated pawl, the actuation of said relay causing said pawl to engage and stop the motion of said encoder gear.

33. A control system as defined in claim 31, wherein said second switch is actuated between its said initial and second states before any openings in said encoder gear cooperate with said light emitting and said light sensitive devices for pulse generation purposes.

34. A control system as defined in claim 29, wherein said actuator is an electrical motor and said motor is mechanically coupled to said variable focus lens through a gear train, at least one gear in said gear train being mounted in a fixed position with respect to a movable portion of said variable focus lens, said fixedly mounted gear being mounted for rotation about the principle image forming axis of said variable focus lens.

35. A photographic camera comprising:
   a first switch, manually actuatable between an initial state and a second state for selectively coupling said camera to a source of energy;
   a housing member, said member enclosing a film plane in a light-tight exposure chamber;
   a shutter mechanism, mounted in said housing, for admitting, and precluding the admission of image containing light rays to said film plane;
   a manually movable variable focus lens mounted on said housing member, said lens being movable between a first region where it can focus an image of a subject at said film plane for picture taking purposes and a second region where said image cannot be so focused at said film plane without repositioning said camera;
   a second switch, actuatable between an initial state and a second state in response to movement of said lens as said lens moves in said second region;
   a rangefinder for deriving a signal representative of the actual distance between said camera and an object remote therefrom, said rangefinder being rendered operative by the actuation of said first switch to its said second state if said second switch is in its said initial state;
   an actuator, operatively coupled to said manually movable variable focus lens, for moving said lens from said second region to said first region in response to the actuation of said first switch to its said second state and said rangefinder derived distance signal, if said second switch is in its said initial state, said actuator being precluded from moving said lens, if said second switch is in its said second state;
   means for sensing that said lens has moved at least a minimum distance within said second region to a position within said first region where an image of said subject is in focus at said film plane;
   means responsive to said lens position sensing means for stopping the movement of said lens in said first region at said subject-in-focus position; and
   means, responsive to said lens position sensing means if said second switch is in its said initial state when said first switch is actuated to its said second state and to the actuation of said first switch to its said second state, if said second switch is in said second state when said first switch is actuated to its second state, for actuating said shutter mechanism.

36. A control system as defined in claim 35, wherein said lens movement sensing means comprises:
   means for deriving a signal representative of variable focus lens focusing movement; and
   means for generating a signal representative of the combination of said lens movement signal and said rangefinder derived signal when said combination signal reaches a predetermined value, said predetermined combination signal indicating that said variable focus lens focusing is complete.

37. A control system as defined in claim 36, wherein said means for deriving a signal representative of variable focus lens focusing movement is an encoder gear mounted in a fixed relation with respect to a portion of, and having a known relationship with respect to the focal length of said variable focus lens, said encoder gear having equally spaced openings positioned a fixed radial distance from a relatively fixed point, said openings cooperating with light emitting and light sensitive devices to periodically block and unblock light transmitted by said light emitting device to said light sensitive device, each combination of said light blocking and unblocking causing the generation of a pulse, the sum total of such pulses being representative of the focal position of said variable focus lens, and wherein said means for generating said focusing complete signal is a pulse counter and a decoder, said decoder providing an output indicating that focusing is complete when the pulses counted by said pulse counter reaches a predetermined value.

38. A control system as defined in claim 37, wherein said means for stopping the movement of said lens at said subject-in-focus position is a relay actuated pawl, the actuation of said relay causing said pawl to engage and stop the motion of said encoder gear.

39. A control system as defined in claim 37, wherein said second switch is actuated between its said initial and second states before any openings in said encoder gear cooperate with said light emitting and said light sensitive devices for pulse generation purposes.

40. A control system as defined in claim 35, wherein said actuator is an electrical motor and said motor is mechanically coupled to said variable focus lens through a gear train, at least one gear in said gear train being mounted in a fixed position with respect to a movable portion of said variable focus lens, said fixedly mounted gear being mounted for rotation about the principle image forming axis of said variable focus lens.

41. A photographic camera comprising:
- a first switch, manually actuatable between an initial state and a second state for selectively coupling said camera to a source of energy;
- a housing member, said member enclosing a film plane in a light-tight exposure chamber;
- a shutter mechanism, mounted on said housing, for admitting, and precluding the admission of image containing light rays to said film plane;
- a manually movable variable focus lens mounted on said housing member, said lens being movable between a first region where it can focus an image of a subject at said film plane for picture taking purposes and a second region where said image cannot be so focused at said film plane without repositioning said camera;
- a second switch, actuatable between an initial state and a second state in response to movement of said lens as said lens moves in said second region;
- a rangefinder for deriving a signal representative of the actual distance between said camera and an object remote therefrom, said rangefinder being rendered operative by the actuation of said first switch to its said second state if said second switch is in its said initial state;
- an actuator, operatively coupled to said manually movable variable focus lens, for moving said lens from said second region to said first region in response to the actuation of said first switch to its said second state and said rangefinder derived distance signal, if said second switch is in its said initial state, and for moving said lens from said first region to said second region in response to the actuation of said first switch to its said initial state and the actuation of said shutter mechanism, if said second switch is in its said second state, the actuation of said second switch by the movement of said lens from said first region to said second region limiting the actuating force supplied by said actuator;
- means for sensing that said lens has moved at least a minimum distance within said second region to a position within said first region where an image of said subject is in focus at said film plane;
- means responsive to said lens position sensing means for stopping the movement of said lens in said first region at said subject-in-focus position; and
- means, responsive to said lens position sensing means if said second switch is in its said initial state and to the actuation of said first switch to its said second state if said second actuator is in its said second state, for actuating said shutter mechanism.

42. A control system as defined in claim 41, wherein said lens movement sensing means comprises:
- means for deriving a signal representative of variable focus lens focusing movement; and
- means for generating a signal representative of the combination of said lens movement signal and said rangefinder derived signal when said combination signal reaches a predetermined value, said predetermined combination signal indicating that said variable focus lens focusing is complete.

43. A control system as defined in claim 42, wherein said means for deriving a signal representative of variable focus lens focusing movement is an encoder gear mounted in a fixed relation with respect to a portion of, and having a known relationship with respect to the focal length of said variable focus lens, said encoder gear having equally spaced openings positioned a fixed radial distance from a relatively fixed point, said openings cooperating with light emitting and light sensitive devices to periodically block and unblock light transmitted by said light emitting device to said light sensitive device, each combination of said light blocking and unblocking causing the generation of a pulse, the sum total of such pulses being representative of the focal position of said variable focus lens, and wherein said means for generating said focusing complete signal is a pulse counter and a decoder, said decoder providing an output indicating that focusing is complete when the pulses counted by said pulse counter reaches a predetermined value.

44. A control system as defined in claim 43, wherein said means for stopping the movement of said lens at said subject-in-focus position is a relay actuated pawl, the actuation of said relay causing said pawl to engage and stop the motion of said encoder gear.

45. A control system as defined in claim 43, wherein said second switch is actuated between its said initial and second states before any openings in said encoder gear cooperate with said light emitting and said light sensitive devices for pulse generation purposes.

46. A control system as defined in claim 41, wherein said actuator is an electrical motor and said motor is mechanically coupled to said variable focus lens through a gear train, at least one gear in said gear train being mounted in a fixed position with respect to a movable portion of said variable focus lens, said fixedly mounted gear being mounted for rotation about the principle image forming axis of said variable focus lens.

47. A photographic camera comprising:
- a first switch, manually actuatable between an initial state and a second state for selectively coupling said camera to a source of energy;
- a housing member, said member enclosing a film plane in a light-tight exposure chamber;
- a shutter mechanism, mounted on said housing, for admitting, and precluding the admission of image containing light rays to said film plane;
- a manually movable variable focus lens mounted on said housing member, said lens being movable between a first region where it can focus an image of a subject at said film plane for picture taking purposes and a second region where said image cannot be so focused at said film plane without repositioning said camera;
- a second switch, actuatable between an initial state and a second state in response to movement of said lens as said lens moves in said second region;
- a rangefinder for deriving a signal representative of the actual distance between said camera and an object remote therefrom, said rangefinder being rendered operative by the actuation of said first switch to its said second state if said second switch is in its said initial state;

an actuator, operatively coupled to said manually movable variable focus lens, for moving said lens from said second region to said first region in response to the actuation of said first switch to its said second state and said rangefinder derived distance signal, if said second switch is in its said initial state, said actuator being precluded from moving said lens if said second switch means is in its said second state;

a third switch, manually actuatable between an initial state and a second state;

means for sensing that said lens has moved at least a minimum distance within said second region to a position within said first region where an image of said subject is in focus at said film plane;

means responsive to said lens position sensing means for stopping the movement of said lens in said first region at said subject-in-focus position; and means, responsive to said lens position sensing means and the actuation of said third switch from its said initial state to its said second state if said second switch means is in its said initial state and to the actuation of said third switch from its said initial state to its said second state if said second switch is in its said second state, for actuating said shutter mechanism.

48. A control system as defined in claim 47, wherein said lens movement sensing means comprises:

means for deriving a signal representative of variable focus lens focusing movement; and means for generating a signal representative of the combination of said lens movement signal and said rangefinder derived signal when said combination signal reaches a predetermined value, said predetermined combination signal indicating that said variable focus lens focusing is complete.

49. A control system as defined in claim 48, wherein said means for deriving a signal representative of variable focus lens focusing movement is an encoder gear mounted in a fixed relation with respect to a portion of and having a known relationship with respect to the focal length of said variable focus lens, said encoder gear having equally spaced openings positioned a fixed radial distance from a relatively fixed point, said openings cooperating with light emitting and light sensitive devices to periodically block and unblock light transmitted by said light emitting device to said light sensitive device, each combination of said light blocking and unblocking causing the generation of a pulse, the sum total of such pulses being representative of the focal position of said variable focus lens, and wherein said means for generating said focusing complete signal is a pulse counter and a decoder, said decoder providing an output indicating that focusing is complete when the pulses counted by said pulse counter reaches a predetermined value.

50. A control system as defined in claim 49, wherein said means for stopping the movement of said lens at said subject-in-focus position is a relay actuated pawl, the actuation of said relay causing said pawl to engage and stop the motion of said encoder gear.

51. A control system as defined in claim 49, wherein said second switch is actuated between its said initial and second states before any openings in said encoder gear cooperate with said light emitting and said light sensitive devices for pulse generation purposes.

52. A control system as defined in claim 47, wherein said third switch is precluded from being actuated to its said second state until said first switch has been actuated to its said second state.

53. A control system as defined in claim 47, wherein an output from said third switch is precluded when said third switch has been actuated to its said second state until said first switch has been actuated to its said second state.

54. A control system as defined in claim 47, wherein said actuator is an electrical motor and said motor is mechanically coupled to said variable focus lens through a gear train, at least one gear in said gear train being mounted in a fixed position with respect to a movable portion of said variable focus lens, said fixedly mounted gear being mounted for rotation about the principle image forming axis of said variable focus lens.

55. A photographic camera comprising:

a first switch, manually actuatable between an initial state and a second state for selectively coupling said camera to a source of energy;

a housing member, said member enclosing a film plane in a light-tight exposure chamber;

a shutter mechanism, mounted on said housing, for admitting, and precluding the admission of image containing light rays to said film plane;

a manually movable variable focus lens mounted on said housing member, said lens being movable between a first region where it can focus an image of a subject at said film plane for picture taking purposes and a second region where said image cannot be so focused at said film plane without repositioning said camera;

a second switch, actuatable between an initial state and a second state in response to movement of said lens as said lens moves in said second region;

a rangefinder for deriving a signal representative of the actual distance between said camera and an object remote therefrom, said rangefinder being rendered operative by the actuation of said first switch to its said second state if said second switch is in its said initial state;

an actuator, operatively coupled to said manually movable variable focus lens, for moving said lens from said second region to said first region in response to the actuation of said first switch to its said second state and said rangefinder derived distance signal, if said second switch is in its said initial state, and for moving said lens from said first region to said second region in response to the actuation of said first switch to its said initial state and the actuation of said shutter mechanism, if said second switch is in said second state, the actuation of said second switch by the movement of said lens from said first region to said second region limiting the actuating force supplied by said actuator;

a third switch, manually actuatable between an initial state and a second state;

means for sensing that said lens has moved at least a minimum distance within said second region to a position within said first region where an image of said subject is in focus at said film plane;

means responsive to said lens position sensing means for stopping the movement of said lens in said first region at said subject-in-focus position; and means, responsive to said lens position sensing means and the actuation of said third switch from its said initial state to its said second state if said second switch means is in its said initial state, and to the actuation of said third switch means from its said initial state to its said second state if said second switch is in its said second state, for actuating said shutter mechanism.

56. A control system as defined in claim 55, wherein said lens movement sensing means comprises:
   means for deriving a signal representative of variable focus lens focusing movement; and
   means for generating a signal representative of the combination of said lens movement signal and said rangefinder derived signal when said combination signal reaches a predetermined value, said predetermined combination signal indicating that said variable focus lens focusing is complete.

57. A control system as defined in claim 56, wherein said means for deriving a signal representative of variable focus lens focusing movement is an encoder gear mounted in a fixed relation with respect to a portion of, and having a known relationship with respect to the focal length of said variable focus lens, said encoder gear having equally spaced openings positioned a fixed radial distance from a relatively fixed point, said openings cooperating with light emitting and light sensitive devices to periodically block and unblock light transmitted by said light emitting device to said light sensitive device, each combination of said light blocking and unblocking causing the generation of a pulse, the sum total of such pulses being representative of the focal position of said variable focus lens, and wherein said means for generating said focusing complete signal is a pulse counter and a decoder, said decoder providing an output indicating that focusing is complete when the pulses counted by said pulse counter reaches a predetermined value.

58. A control system as defined in claim 57, wherein said means for stopping the movement of said lens at said subject-in-focus position is a relay actuated pawl, the actuation of said relay causing said pawl to engage and stop the motion of said encoder gear.

59. A control system as defined in claim 57, wherein said second switch is actuated between its said initial and second states before any openings in said encoder gear cooperate with said light emitting and said light sensitive devices for pulse generation purposes.

60. A control system as defined in claim 55, wherein said third switch is precluded from being actuated to its said second state until said first switch has been actuated to its said second state.

61. A control system as defined in claim 55, wherein an output from said third switch is precluded when said third switch has been actuated to its said second state until said first switch has been actuated to its said second state.

62. A control system as defined in claim 55, wherein said actuator is an electrical motor and said motor is mechanically coupled to said variable focus lens through a gear train, at least one gear in said gear train being mounted in a fixed position with respect to a movable portion of said variable focus lens, said fixedly mounted gear being mounted for rotation about the principle image forming axis of said variable focus lens.

* * * * *